US008658280B2

(12) United States Patent
Argoitia et al.

(10) Patent No.: US 8,658,280 B2
(45) Date of Patent: Feb. 25, 2014

(54) TAGGENT FLAKES FOR COVERT SECURITY APPLICATIONS HAVING A SELECTED SHAPE

(75) Inventors: Alberto Argoitia, Santa Rosa, CA (US); Cornelis Jan Delst, Fairfax, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 88 days.

(21) Appl. No.: 13/284,689

(22) Filed: Oct. 28, 2011

(65) Prior Publication Data

US 2012/0107738 A1    May 3, 2012

Related U.S. Application Data

(63) Continuation of application No. 12/378,371, filed on Feb. 13, 2009, and a continuation-in-part of application No. 11/931,816, filed on Oct. 31, 2007, which is a continuation-in-part of application No. 11/243,122, filed on Oct. 4, 2005, now Pat. No. 7,645,510, and a continuation-in-part of application No. 10/762,158, filed on Jan. 20, 2004, now Pat. No. 7,241,489, which is a continuation-in-part of application No. 10/641,695, filed on Aug. 14, 2003, now Pat. No. 7,258,915, and a continuation-in-part of application No. 10/243,111, filed on Sep. 13, 2002, now Pat. No. 6,902,807, application No. 13/284,689, which is a continuation-in-part of application No. 12/463,114, filed on May 8, 2009, application No. 13/284,689, which is a continuation-in-part of application No. 12/938,304, filed on Nov. 2, 2010.

(60) Provisional application No. 61/028,442, filed on Feb. 13, 2008, provisional application No. 60/696,593, filed on Jul. 5, 2005, provisional application No. 61/051,463, filed on May 8, 2008, provisional application No. 61/257,664, filed on Nov. 3, 2009.

(51) Int. Cl.
*B32B 5/16* (2006.01)
(52) U.S. Cl.
USPC ............................................. 428/402
(58) Field of Classification Search
USPC ............................................. 428/402
See application file for complete search history.

(56) References Cited

U.S. PATENT DOCUMENTS 2,570,856 A   10/1951   Pratt et al. ................... 41/32
3,011,383 A   12/1961   Sylvester et al. ............ 359/584

(Continued)

FOREIGN PATENT DOCUMENTS

AU   488652    11/1977   ............... B44F 1/12
DE   1696245    1/1972    ............... D21H 5/10

(Continued)

*Primary Examiner* — Hoa V Le
(74) *Attorney, Agent, or Firm* — Matthew A. Pequignot; Pequignot + Myers LLC

(57) ABSTRACT

A plurality of flakes are provided that can be used in ink or paint wherein the flakes are of a size that requires magnification to see their shape, in the form of polygons, such as squares, triangle or rectangles. A breaking or grinding process is used to break a foil into these shaped flakes and frames or walls are provided within the foil sheet so as to delineate the shapes and these lines provided by frames or walls will facilitate breakage in a preferred manner such that the flakes break into selected shaped polygons. Remnants are typically present along flake edges due to the grinding and breakage process however with magnification, one can see the resultant regular polygonal shape. To clearly see the remnants one requires increased magnification and the remnant itself provides a type of signature. It can be seen as a taggent within a taggent.

11 Claims, 11 Drawing Sheets

(56) References Cited

U.S. PATENT DOCUMENTS

| | | | | |
|---|---|---|---|---|
| 3,123,490 A | 3/1964 | Bolomey et al. | | 106/291 |
| 3,338,730 A | 8/1967 | Slade et al. | | 428/142 |
| 3,610,721 A | 10/1971 | Abramson et al. | | 350/3.5 |
| 3,627,580 A | 12/1971 | Krall | | 117/238 |
| 3,633,720 A | 1/1972 | Tyler | | 400/105 |
| 3,676,273 A | 7/1972 | Graves | | 161/3 |
| 3,790,407 A | 2/1974 | Merten et al. | | 117/240 |
| 3,791,864 A | 2/1974 | Steingroever | | 117/238 |
| 3,845,499 A | 10/1974 | Ballinger | | 346/74.3 |
| 3,853,676 A | 12/1974 | Graves | | 161/5 |
| 3,873,975 A | 3/1975 | Miklos et al. | | 360/25 |
| 4,011,009 A | 3/1977 | Lama et al. | | 359/571 |
| 4,053,433 A | 10/1977 | Lee | | 252/408 |
| 4,054,922 A | 10/1977 | Fichter | | 346/74.3 |
| 4,066,280 A | 1/1978 | LaCapria | | 283/91 |
| 4,099,838 A | 7/1978 | Cook et al. | | 359/537 |
| 4,126,373 A | 11/1978 | Moraw | | 359/2 |
| 4,155,627 A | 5/1979 | Gale et al. | | 359/568 |
| 4,168,983 A | 9/1979 | Vittands et al. | | 106/14.12 |
| 4,174,170 A | 11/1979 | Yamamoto et al. | | 399/311 |
| 4,197,563 A | 4/1980 | Michaud | | 346/74.3 |
| 4,244,998 A | 1/1981 | Smith | | 428/195 |
| 4,271,782 A | 6/1981 | Bate et al. | | 118/623 |
| 4,310,584 A | 1/1982 | Cooper et al. | | 428/212 |
| 4,394,477 A * | 7/1983 | Screeton | | 524/319 |
| 4,398,798 A | 8/1983 | Krawczak et al. | | 359/573 |
| 4,434,010 A | 2/1984 | Ash | | 106/415 |
| 4,543,551 A | 9/1985 | Peterson | | 335/284 |
| 4,652,395 A | 3/1987 | Marcina et al. | | |
| 4,685,793 A | 8/1987 | Sawada et al. | | 399/391 |
| 4,705,300 A | 11/1987 | Berning et al. | | 283/91 |
| 4,705,356 A | 11/1987 | Berning et al. | | 350/166 |
| 4,721,217 A | 1/1988 | Phillips et al. | | 215/230 |
| 4,756,771 A | 7/1988 | Brodalla et al. | | 148/244 |
| 4,779,898 A | 10/1988 | Berning et al. | | 283/58 |
| 4,788,116 A | 11/1988 | Hochberg | | 430/21 |
| 4,838,648 A | 6/1989 | Phillips et al. | | 359/585 |
| 4,847,652 A | 7/1989 | Masuda et al. | | 399/316 |
| 4,867,793 A | 9/1989 | Franz et al. | | 106/415 |
| 4,930,866 A | 6/1990 | Berning et al. | | 359/589 |
| 4,931,309 A | 6/1990 | Komatsu et al. | | 427/599 |
| 5,002,312 A | 3/1991 | Phillips et al. | | 283/72 |
| 5,009,486 A | 4/1991 | Dobrowolski et al. | | 359/580 |
| 5,059,245 A | 10/1991 | Phillips et al. | | 106/31.65 |
| 5,079,058 A | 1/1992 | Tomiyama | | 428/40 |
| 5,079,085 A | 1/1992 | Hashimoto et al. | | 428/327 |
| 5,084,351 A | 1/1992 | Phillips et al. | | 428/411.1 |
| 5,106,125 A | 4/1992 | Antes | | 283/91 |
| 5,128,779 A | 7/1992 | Mallik | | 359/2 |
| 5,135,812 A | 8/1992 | Phillips et al. | | 428/403 |
| 5,142,383 A | 8/1992 | Mallik | | 359/2 |
| 5,171,363 A | 12/1992 | Phillips et al. | | 106/31.65 |
| 5,177,344 A | 1/1993 | Pease | | 235/449 |
| 5,186,787 A | 2/1993 | Phillips et al. | | 216/36 |
| 5,192,611 A | 3/1993 | Tomiyama et al. | | 428/354 |
| 5,208,630 A | 5/1993 | Goodbrand et al. | | 399/15 |
| 5,214,530 A | 5/1993 | Coombs et al. | | 359/359 |
| 5,223,360 A | 6/1993 | Prengel et al. | | 430/39 |
| 5,254,390 A | 10/1993 | Lu | | 428/328 |
| 5,278,590 A | 1/1994 | Phillips et al. | | 359/589 |
| 5,279,657 A | 1/1994 | Phillips et al. | | 106/31.65 |
| 5,339,737 A | 8/1994 | Lewis et al. | | 101/454 |
| 5,354,374 A | 10/1994 | Prengel | | 106/459 |
| 5,364,467 A | 11/1994 | Schmid et al. | | 106/415 |
| 5,364,689 A | 11/1994 | Kashiwagi et al. | | 428/195.1 |
| 5,368,898 A | 11/1994 | Akedo | | 427/510 |
| 5,411,296 A | 5/1995 | Mallik | | 283/86 |
| 5,424,119 A | 6/1995 | Phillips et al. | | 428/328 |
| 5,437,931 A | 8/1995 | Tsai et al. | | 428/446 |
| 5,447,335 A | 9/1995 | Haslop | | 283/91 |
| 5,464,710 A | 11/1995 | Yang | | 430/1 |
| 5,474,814 A | 12/1995 | Komatsu et al. | | 427/549 |
| 5,549,774 A | 8/1996 | Miekka et al. | | 156/209 |
| 5,549,953 A | 8/1996 | Li | | 428/64.1 |
| 5,571,624 A | 11/1996 | Phillips et al. | | 428/403 |
| 5,591,527 A | 1/1997 | Lu | | 428/411.1 |
| 5,613,022 A | 3/1997 | Odhner et al. | | 385/37 |
| 5,624,076 A | 4/1997 | Miekka et al. | | 241/3 |
| RE35,512 E | 5/1997 | Nowak et al. | | 101/454 |
| 5,627,663 A | 5/1997 | Horan et al. | | 359/2 |
| 5,629,068 A | 5/1997 | Miekka et al. | | 428/148 |
| 5,630,877 A | 5/1997 | Kashiwagi et al. | | 118/623 |
| 5,648,165 A | 7/1997 | Phillips et al. | | 428/346 |
| 5,650,248 A | 7/1997 | Miekka et al. | | 430/1 |
| 5,653,792 A * | 8/1997 | Phillips et al. | | 106/400 |
| 5,672,410 A | 9/1997 | Miekka et al. | | 428/148 |
| 5,700,550 A | 12/1997 | Uyama et al. | | 428/212 |
| 5,742,411 A | 4/1998 | Walters | | 359/2 |
| 5,744,223 A | 4/1998 | Abersfelder et al. | | 428/206 |
| 5,753,392 A | 5/1998 | Ray et al. | | 430/45.1 |
| 5,763,086 A | 6/1998 | Schmid et al. | | 428/404 |
| 5,811,775 A | 9/1998 | Lee | | 235/457 |
| 5,814,367 A | 9/1998 | Hubbard et al. | | 427/162 |
| 5,815,292 A | 9/1998 | Walters | | 359/2 |
| 5,856,048 A | 1/1999 | Tahara et al. | | 430/1 |
| 5,858,078 A | 1/1999 | Andes et al. | | 106/437 |
| 5,907,436 A | 5/1999 | Perry et al. | | 359/576 |
| 5,912,767 A | 6/1999 | Lee | | 359/567 |
| 5,989,626 A | 11/1999 | Coombs et al. | | 427/162 |
| 5,991,078 A | 11/1999 | Yoshitake et al. | | 359/567 |
| 6,013,370 A | 1/2000 | Coulter et al. | | 428/403 |
| 6,031,457 A | 2/2000 | Bonkowski et al. | | 340/572.1 |
| 6,033,782 A | 3/2000 | Hubbard et al. | | 428/407 |
| 6,043,936 A | 3/2000 | Large | | 359/572 |
| 6,045,230 A | 4/2000 | Dreyer et al. | | 359/529 |
| 6,068,691 A | 5/2000 | Miekka et al. | | 106/403 |
| 6,071,665 A | 6/2000 | Dickerson et al. | | 430/137.21 |
| 6,103,361 A | 8/2000 | Batzar et al. | | 428/323 |
| 6,112,388 A | 9/2000 | Kimoto et al. | | 29/17.3 |
| 6,114,018 A | 9/2000 | Phillips et al. | | 428/200 |
| 6,150,022 A | 11/2000 | Coulter et al. | | 428/403 |
| 6,157,489 A | 12/2000 | Bradley, Jr. et al. | | 359/584 |
| 6,168,100 B1 | 1/2001 | Kato et al. | | 241/1 |
| 6,235,105 B1 | 5/2001 | Hubbard et al. | | 106/415 |
| 6,241,858 B1 | 6/2001 | Phillips et al. | | 204/192.15 |
| 6,242,510 B1 | 6/2001 | Killey | | 523/204 |
| 6,243,204 B1 | 6/2001 | Bradley, Jr. et al. | | 359/585 |
| 6,376,018 B1 | 4/2002 | Kittler, Jr. | | 427/294 |
| 6,403,169 B1 | 6/2002 | Hardwick et al. | | 427/548 |
| 6,549,131 B1 | 4/2003 | Cote et al. | | 340/572.1 |
| 6,586,098 B1 | 7/2003 | Coulter et al. | | 428/403 |
| 6,589,331 B2 | 7/2003 | Ostertag et al. | | 106/460 |
| 6,630,018 B2 | 10/2003 | Bauer et al. | | 106/415 |
| 6,643,001 B1 | 11/2003 | Faris | | 356/37 |
| 6,649,256 B1 | 11/2003 | Buczek et al. | | 428/323 |
| 6,686,027 B1 | 2/2004 | Caporaletti et al. | | 428/195.1 |
| 6,692,031 B2 | 2/2004 | McGrew | | |
| 6,692,830 B2 | 2/2004 | Argoitia et al. | | 428/403 |
| 6,712,399 B1 | 3/2004 | Drinkwater et al. | | 283/111 |
| 6,749,777 B2 | 6/2004 | Argoitia et al. | | 252/582 |
| 6,749,936 B2 | 6/2004 | Argoitia et al. | | 428/402 |
| 6,751,022 B2 | 6/2004 | Phillips | | 359/577 |
| 6,759,097 B2 | 7/2004 | Phillips et al. | | 427/510 |
| 6,761,959 B1 | 7/2004 | Bonkowski et al. | | 428/156 |
| 6,808,806 B2 | 10/2004 | Phillips et al. | | |
| 6,815,065 B2 | 11/2004 | Argoitia et al. | | 428/403 |
| 6,818,299 B2 | 11/2004 | Phillips et al. | | 428/403 |
| 6,838,166 B2 | 1/2005 | Phillips et al. | | 428/323 |
| 6,841,238 B2 | 1/2005 | Argoitia et al. | | |
| 6,902,807 B1 | 6/2005 | Argoitia et al. | | 428/403 |
| 6,987,590 B2 | 1/2006 | Phillips et al. | | 359/2 |
| 7,029,525 B1 | 4/2006 | Mehta | | 106/31.6 |
| 7,047,883 B2 | 5/2006 | Raksha et al. | | |
| 7,241,489 B2 | 7/2007 | Argoitia et al. | | |
| 7,258,915 B2 | 8/2007 | Argoitia et al. | | 428/323 |
| 7,396,401 B2 | 7/2008 | Jungnitz et al. | | 106/415 |
| 7,550,197 B2 | 6/2009 | Kittler, Jr. et al. | | 428/323 |
| 7,645,510 B2 | 1/2010 | Arogitia | | 428/402 |
| 2002/0021003 A1 | 2/2002 | McGrew | | 283/93 |
| 2002/0097832 A1 | 7/2002 | Kaiser et al. | | 378/45 |
| 2002/0182383 A1 | 12/2002 | Phillips | | 428/199 |
| 2002/0192585 A1 | 12/2002 | Brenner et al. | | 430/108.6 |
| 2003/0058491 A1 | 3/2003 | Holmes et al. | | 359/2 |
| 2003/0087070 A1 | 5/2003 | Souparis | | 283/91 |

(56) References Cited

U.S. PATENT DOCUMENTS

| | | | |
|---|---|---|---|
| 2003/0104206 A1 | 6/2003 | Argoitia et al. | 428/402 |
| 2003/0177949 A1 | 9/2003 | Phillips et al. | 106/403 |
| 2003/0185972 A1 | 10/2003 | Rieck et al. | 427/140 |
| 2003/0190473 A1 | 10/2003 | Argoitia et al. | 428/403 |
| 2003/0224164 A1 | 12/2003 | Argoitia | 428/403 |
| 2004/0009309 A1 | 1/2004 | Raksha et al. | 427/598 |
| 2004/0051297 A1 | 3/2004 | Raksha et al. | 101/489 |
| 2004/0081807 A1 | 4/2004 | Bonkowski et al. | 428/195.1 |
| 2004/0094850 A1 | 5/2004 | Bonkowski et al. | 264/1.34 |
| 2004/0100707 A1 | 5/2004 | Kay et al. | 359/883 |
| 2004/0101676 A1 | 5/2004 | Phillips | 428/323 |
| 2004/0105963 A1 | 6/2004 | Bonkowski et al. | 428/195.1 |
| 2004/0151827 A1 | 8/2004 | Argoitia et al. | 427/7 |
| 2005/0024626 A1 | 2/2005 | Faris et al. | 356/71 |
| 2005/0037192 A1 | 2/2005 | Argoitia et al. | 428/323 |
| 2005/0063067 A1 | 3/2005 | Phillips et al. | 359/623 |
| 2005/0106367 A1 | 5/2005 | Raksha et al. | 428/195.1 |
| 2005/0123755 A1 | 6/2005 | Argoitia et al. | 428/402 |
| 2005/0128543 A1 | 6/2005 | Phillips et al. | 359/15 |
| 2005/0189060 A1 | 9/2005 | Huang et al. | 156/99 |
| 2005/0277704 A1 | 12/2005 | Edwards et al. | 522/71 |
| 2006/0035080 A1 | 2/2006 | Argoitia et al. | 428/402 |
| 2006/0077496 A1 | 4/2006 | Argoitia | 359/2 |
| 2007/0058227 A1 | 3/2007 | Raksha et al. | 359/2 |
| 2008/0069979 A1 | 3/2008 | Raksha et al. | 428/29 |
| 2008/0107856 A1 | 5/2008 | Argoitia et al. | 428/43 |
| 2008/0236447 A1 | 10/2008 | Argoitia | 106/31.65 |
| 2009/0072185 A1 | 3/2009 | Raksha et al. | 252/62.51 R |

FOREIGN PATENT DOCUMENTS

| | | | |
|---|---|---|---|
| DE | 3932505 | 4/1991 | B44F 1/12 |
| DE | 4212290 | 5/1993 | B44F 1/12 |
| DE | 4343387 | 6/1995 | B44F 1/12 |
| DE | 19611383 | 9/1997 | B44F 1/12 |
| DE | 19731968 | 1/1999 | B44F 1/12 |
| DE | 19744953 | 4/1999 | B44F 1/12 |
| DE | 19639165 | 10/2003 | C09B 67/02 |
| EP | 0138194 | 10/1984 | B32B 27/08 |
| EP | 0185396 | 12/1985 | D21H 5/10 |
| EP | 0341002 | 11/1989 | G06K 19/08 |
| EP | 0420261 | 4/1991 | G06K 19/00 |
| EP | 0453131 | 10/1991 | B32B 29/04 |
| EP | 0556449 | 8/1993 | B05D 3/14 |
| EP | 406667 | 1/1995 | |
| EP | 0660262 | 1/1995 | G06K 19/16 |
| EP | 0170439 | 4/1995 | G02B 5/20 |
| EP | 710508 | 5/1996 | B05D 3/14 |
| EP | 0756945 | 2/1997 | B42D 15/00 |
| EP | 0395410 | 8/1997 | G02B 5/20 |
| EP | 0698256 | 10/1997 | G06K 19/14 |
| EP | 0741370 | 5/1998 | G06K 19/18 |
| EP | 0914261 | 5/1999 | B42D 15/10 |
| EP | 0953937 | 11/1999 | G06K 19/08 |
| EP | 1174278 | 1/2002 | B41M 3/14 |
| EP | 0978373 | 2/2002 | B32B 7/02 |
| EP | 1239307 | 9/2002 | G02B 5/22 |
| EP | 1 353 197 | 10/2003 | G02B 5/18 |
| EP | 1498545 | 1/2005 | D21H 21/42 |
| EP | 1516957 | 3/2005 | D21H 21/42 |
| EP | 1529653 | 5/2005 | B42D 15/00 |
| EP | 1674282 | 6/2006 | B41M 3/14 |
| EP | 1719636 | 11/2006 | B42D 15/10 |
| EP | 1741757 | 1/2007 | C09C 1/00 |
| EP | 1745940 | 1/2007 | B41M 5/36 |
| EP | 1760118 | 3/2007 | C09C 1/00 |
| GB | 1107395 | 3/1968 | G03G 1/00 |
| GB | 1131038 | 10/1968 | B44F 3/00 |
| JP | 63172279 | 7/1988 | G03G 9/08 |
| JP | 11010771 | 1/1999 | B32B 7/02 |
| WO | 8807214 | 9/1988 | G02B 5/128 |
| WO | 9323251 | 11/1993 | B41M 3/14 |
| WO | 9517475 | 1/1995 | C09C 1/00 |
| WO | 9513569 | 5/1995 | G03F 7/00 |
| WO | 9719820 | 6/1997 | B42D 15/10 |
| WO | 9812583 | 3/1998 | G02B 5/28 |
| WO | 0008596 | 2/2000 | G06K 19/06 |
| WO | 0103945 | 1/2001 | B42D 15/10 |
| WO | 01/53113 | 7/2001 | B42D 15/10 |
| WO | 0200446 | 1/2002 | B42D 15/10 |
| WO | 0204234 | 1/2002 | B44F 1/10 |
| WO | 0240599 | 5/2002 | C09C 1/00 |
| WO | 0240600 | 5/2002 | C09C 1/00 |
| WO | 02053677 | 7/2002 | C09K 11/08 |
| WO | 02090002 | 11/2002 | B05D 3/14 |
| WO | 03102084 | 12/2003 | C09C 1/00 |
| WO | 2004/024836 | 3/2004 | C09D 5/36 |
| WO | 2005/017048 | 2/2005 | C09C 1/00 |

\* cited by examiner

Partially broken left-over areas or remnants after grinding process

TAGGENT FLAKES FOR COVERT SECURITY APPLICATIONS HAVING A SELECTED SHAPE

CROSS-REFERENCE TO RELATED APPLICATIONS

The present application is a continuation-in-part of commonly owned, co-pending U.S. patent application Ser. No. 11/931,816 filed Oct. 31, 2007 which is a continuation-in-part U.S. patent application Ser. No. 11/243,122 filed Oct. 4, 2005, now issued U.S. Pat. No. 7,645,510, which claims priority from U.S. Patent Application No. 60/696,593 filed Jul. 5, 2005, and is a continuation-in-part of U.S. patent application Ser. No. 10/762,158 filed Jan. 20, 2004, now issued U.S. Pat. No. 7,241,489, which is a continuation-in-part of U.S. patent application Ser. No. 10/641,695, filed Aug. 14, 2003, now issued U.S. Pat. No. 7,258,915, and which is also a continuation-in-part of U.S. patent application Ser. No. 10/243,111 filed Sep. 13, 2002, now issued U.S. Pat. No. 6,902,807, the disclosures of which are hereby incorporated in their entirety for all purposes.

The present application is a continuation-in-part of commonly owned, co-pending U.S. patent application Ser. No. 12/463,114 filed May 8, 2009, claims priority from U.S. provisional patent application No. 61/051,463 filed May 8, 2008, and is a continuation-in-part of U.S. patent application Ser. No. 11/243,122 filed Oct. 4, 2005, now issued U.S. Pat. No. 7,645,510, which claims priority from U.S. Patent Application No. 60/696,593 filed Jul. 5, 2005, and is a continuation-in-part of U.S. patent application Ser. No. 10/762,158 filed Jan. 20, 2004, now issued U.S. Pat. No. 7,241,489, which is a continuation-in-part of U.S. patent application Ser. No. 10/641,695 filed Aug. 14, 2003, now issued U.S. Pat. No. 7,258,915, and also is a continuation-in-part of U.S. patent application Ser. No. 10/243,111 filed Sep. 13, 2002, now issued U.S. Pat. No. 6,902,807, the disclosures of which are incorporated herein by reference for all purposes.

The present application is a continuation-in-part of commonly owned, co-pending U.S. patent application Ser. No. 12/938,304 filed Nov. 2, 2010, which claims priority from U.S. Provisional Patent Application No. 61/257,664 filed Nov. 3, 2009, which are incorporated herein by reference for all purposes.

The present application is a continuation-in-part of commonly owned, co-pending U.S. patent application Ser. No. 12/378,371 filed Feb. 13, 2009, which claims priority from U.S. Patent Application No. 61/028,442 filed Feb. 13, 2008, which are incorporated herein by reference for all purposes.

FIELD OF THE INVENTION

The present invention relates generally to thin-film pigment flakes having one or more layers, and more particularly to the manufacture of shaped taggent flakes having a predetermined selected shape for use in a coating composition.

BACKGROUND OF THE INVENTION

Specialty pigments have been developed for use in security applications, such as anti-counterfeiting devices printed on banknotes, packaging of high-value items, seals for containers, and even for direct application to commercial items. For example, the U.S. twenty-dollar Federal Reserve Note currently uses optically variable ink. The number "20" printed in the lower-right corner of the face of the note changes color as the viewing angle changes. This is an overt anti-counterfeiting device. The color-shifting effect is not reproducible by ordinary color photocopiers, and someone receiving a note can observe whether it has the color-shifting security feature to determine the note's authenticity.

Other high-value documents and objects use similar measures. For example, iridescent pigments or diffractive pigments are used in paints and inks that are applied directly to an article, such as a stock certificate, passport, original product packaging, or to seals that are applied to an article. Security features that are more difficult to counterfeit are desirable as counterfeiters continue to become more sophisticated.

One anti-counterfeiting approach uses microscopic symbols on multi-layer color-shifting pigment flakes. The symbols are formed on at least one of the layers of the multi-layer color-shifting pigment flakes by a local change of an optical property(s), such as reflectivity. The multi-layer color-shifting pigment flakes generally include a Fabry Perot-type structure having an absorbing layer separated from a reflective layer by a spacer layer. The reflective layer is typically a layer of metal, which renders the pigment flake essentially opaque. If a large portion of these types of pigment flakes are mixed with other pigment, the resultant color might be significantly different from the pigment, and if too few of these flakes are mixed with other pigment, they might be difficult to find.

Another technique uses epoxy-encapsulated shaped flakes of polyethylene terephthalate ("PET"). A reflective layer is deposited on a roll of PET, and then the PET is cut into pieces. The flakes are coated or encapsulated with epoxy to improve the durability of the reflective layer. These flakes are available in a variety of shapes, such as square, rectangle, hexagon, and "apostrophe," and a selection of reflective metallic tints, such as silver, pewter, gold, and copper. However, the epoxy layer and the relatively thick PET substrate (which typically has a minimum thickness of about 13 microns (0.5 mils) for use in vacuum deposition processes) result in a relatively thick flake, typically greater than 14 microns. Unfortunately, such a thick flake is not desirable for use in covert applications where the thickness is substantially greater than the base pigment. Similarly, such thick flakes do not flow well in inks, and create lumps in paint. When paint includes a thick flake that creates a rough surface, a relatively thick clear topcoat is typically applied over the rough surface.

It is desirable to mark objects with covert anti-counterfeiting devices that overcome the limitations of the techniques discussed above.

One aspect of this invention relates to providing polygonal shaped flakes wherein a plurality of flakes has a same shape. For example it would be desired to have flakes that are regular polygon shaped flakes, such as square shaped, rectangular shaped or triangular shaped. A particularly important aspect would be to have flakes with approximately the same shape. For example, such that a plurality of flakes could be recognized as square-shaped even though actual edges may differ slightly from the breaking process under which they are formed. In a most preferred embodiment of the invention, a plurality of flakes are formed by breaking or grinding a substrate into regular polygon shaped flakes, where all sides are of a substantially equal length and all angles forming the regular polygon are substantially equal.

Another aspect of this invention relates to providing flakes which have taggents or covert symbols stamped or embossed or etched therein by mechanical means or formed by laser means, wherein the covert symbols can be seen with a microscope. In order to preserve the integrity of the symbols, a frame is provided around all of or part of covert symbols so that when the individual flakes are removed from the support structure they are deposited on, the majority of flakes break along the frame lines provided instead of breaking in a less controlled unpredictable manner wherein break lines would otherwise occur with greater frequency through and about the symbols. In some instances parallel frame lines may be provided so that the flakes break into a ribbon; in a preferred embodiment of this invention, flakes and more particularly one or more symbols within a flake will have a framed grooved border on four or fewer sides about the one or more symbols, so that the flakes break in uniform squares or rectangles along the frame lines. Of course triangular or hexagonal flakes may be provided as well in this manner, by preframing symbols on three sides, prior to removing the flakes from their backing. A conventional release layer is provided so that the flakes can easily be removed from their backing or support layer and so that upon removal, the flakes break up along the faming lines. Frames can be made in a similar manner in which the symbols are made; using a laser, etching or stamping of the film that is upon the substrate; in a preferred embodiment, the frames are provided in the same process along with the formation of the symbols.

When flakes break into random shapes rather than into a regular polygon of a selected shape, the indicia can be damaged by way of the flake breaking along or through the indicia. This is shown in FIG. 6 and FIG. 8a of EP 0978373 in the name of Muller et al.

Although it may be possible to fabricate flakes in great quantities by cutting a substrate into flakes by use of mechanical cutters, it is preferred to have a method for fabricating shaped optical effect or pigment flakes, which is less costly and labour intensive by breaking the flakes along predetermined formed lines. The substrate prior to being crushed or broken has delineations therein which are visible and which facilitate the breakage of the flakes along predetermined lines.

It is a further object of this invention, to provide shaped flakes which may have symbols thereon, and wherein the symbols have or had, frames or borders embossed, or etched into the flake or formed with a laser beam for protecting the symbols during the process of separating flakes from their temporary support backing.

In one aspect, this invention relates to a method of producing flakes having covert symbols therein, wherein convert symbols within the flakes are substantially preserved in the process of removing the flakes from their temporary support backing.

SUMMARY OF THE INVENTION

In accordance with this invention a plurality of shaped covert flakes are provided which may carry a symbol or indicia thereon which cannot be seen without magnification. As a result of the way in which the flakes are broken or ground so as to provide preferred shaped flakes, remnants of frames, or walls are present due to breaking up the foil into individual flakes. By using this method and by providing a structure around the flake region such as a frame or border, there also exists enough control so that the flakes have predetermined polygon shapes. Of course these remnants are evidence of a coarse breaking or grinding process however, the cost benefit of producing flakes in this manner over the resultant remnants being present makes this process desirable commercially. It is not necessary that flakes edges be absolutely straight lines without these small remnants. After all, the shape of these very small flakes can only be seen with adequate magnification and therefore these jagged remnants which comprise a very small percentage of the flake are barely noticeable with just enough magnification to discern the shape of the flake.

In accordance with this invention a plurality of shaped flakes are provided, wherein each flake has a same general polygonal shape, each flake having a thickness greater or equal to 0.01 and less than or equal to 10 microns, and wherein each flake has a remnant in the form of a protruding wall segment on one side of each of the flake wherein the remnant is result of breaking or grinding to form the shaped flakes, and wherein a width of the remnant is less than 20% of a major dimension of the flake so that the general polygonal shape of each flake is distinguishable.

In accordance with another aspect of the invention, a method is provided for producing flakes having indicia thereon, the method comprising the steps of: providing a substrate coated with a release layer; providing an optical coating of one or more layers upon the release layer; inscribing indicia in the form of one or more symbols in a plurality of regions upon the optical coating; inscribing a frame about the indicia, in each region; removing the optical coating from the release layer such that the coating is broken into flakes in the form framed indicia.

In yet another aspect of the invention, flakes are provided which have at least one symbol thereon, wherein the flakes were separated from adjacent flakes by separating along frames or borders etched, lasered or embossed into the sheet prior to their removal.

In accordance with this invention, there is provided, a foil comprising a substrate having a releasable material deposited thereon in the form of one or more thin film layers for forming flakes once removed from the substrate, the one or more thin film layers having a plurality of symbols formed therein at least some of the symbols having frames surrounding the symbols.

In accordance with another aspect of the invention, there is provided, a coating composition comprising: a carrier; and a plurality of single-layer inorganic dielectric covert taggent flakes dispersed in the carrier, wherein the flakes have indicia thereon are surrounded by a frame.

In accordance with the invention there is further provided, a plurality of covert flakes having frames about indicia disposed on each flake for providing lines about which the flakes will break upon removal from a substrate onto which they were backed.

A coating composition includes covert opaque flakes less than about 10 microns thick with identifying indicia. Examples of identifying indicia include selected flake shape (s) and/or compositions. The covert flakes are typically dispersed in a carrier, such as a varnish base, paint vehicle or ink vehicle, to form a coating composition. The covert flakes are dispersed in sufficiently dilute concentration so that the covert flakes are not easily detectable in the coating composition by casual observation and are colored to match the color of a base pigment or have a different optical characteristic, such as being highly reflective ("bright" or "silver"). The shapes of selectively shaped covert flakes are not discerned by unaided human vision, but can be seen under about 50× to 300× magnification. In one embodiment, the covert flakes appear to be essentially identical to base pigment flakes in the composition, but are made of different thin-film layers that are detectable using standard analytical methods.

In a particular embodiment the covert flakes are a single layer of a shaped inorganic dielectric material, such as ZnS. The thickness of the single layer of inorganic dielectric material is selected to provide a covert flake that has color to match mica-based nacreous base pigment.

A composition according to an embodiment of the present invention is applied to an object to provide a covert security feature. A pigmented composition may be used to print a field (e.g. an image) on the object, and a varnish composition with a low concentration of opaque security flakes may be used to overprint an existing image on the object. In an embodiment of the invention, covert flake is mixed with base pigment to provide a covert security feature to images printed with the composition that look substantially similar to images printed with only the base pigment.

DETAILED DESCRIPTION OF THE INVENTION

I. Introduction

Flakes for covert security applications are not typically seen by casual observation. Some sort of inspection technique, such as inspection under a microscope or analytical technique, such as elemental analysis, is used. In one embodiment, opaque flakes containing indicia, such as a particular shape, substantially match the visual characteristics of a bulk pigment or other substance they are mixed with. In a particular embodiment, a single-layer inorganic opaque flake having a selected shape is mixed with an iridescent mica-based flake or other base pigment. For the purpose of this discussion, a "single layer" of inorganic material includes multiple layers of the same inorganic material built up upon each other.

Inorganic covert flakes are particularly desirable in applications where heat, solvents, sunlight, or other factors may degrade organic flakes. For example, an inorganic covert flake used in an explosive is detectable even after exposure to high temperatures and/or pressures, and is persistent in the environment. Flakes according to embodiments of the present invention also are substantially thinner, typically less than about 10 microns, than conventional shaped flakes, enabling their use in ink and produce a smooth surface finish in paints without having to use a clear topcoat. Thin, inorganic flakes according to embodiments of the present invention also have a density closer to the density of base pigment flakes made using similar techniques. Thick flakes incorporating organic substrates often have a different density than thin-film base pigment flake, and may segregate, either before or during application while the carrier is fluid. Flake segregation is undesirable because it can result in an inconsistent ratio of covert and base flakes in a composition, and may degrade the covert nature of the covert flakes if segregation results in an unduly high concentration of covert flakes.

II. Exemplary Opaque Flake

Figure 1:
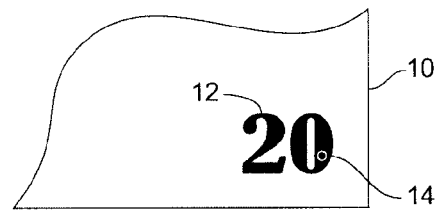
FIG. 1 is a plan view of a portion of a document with a security feature according to an embodiment of the present invention.

FIG. 1 is a plan view of a portion of a document 10 with a security feature 12 according to an embodiment of the present invention. At least a portion 14 of the security feature 12 is printed with ink or paint including opaque flakes having indicia (hereinafter "covert flakes") mixed with bulk pigment, such as bulk pigment flakes. In one embodiment, the covert flakes have a particular shape, such as being square, rectangular, trapezoidal, "diamond" shaped, or round, for example. In another embodiment, the covert flakes include a grating pattern, with or without having a selected shape. Preferably, the selected shape is provided by embossing, etching or using a laser to create frames or borders along which the flakes will facture upon removal from their temporary supporting substrate. In a particular embodiment, the grating pattern has a grating spacing that is not optically active in the visible range of the spectrum. That is, these grating patterns do not form a visible diffraction grating. Covert flakes are also sometimes referred to as taggent flakes, although not all taggent flakes are necessarily covert flakes.

Generally, bulk pigment particles, including bulk pigment flakes, have an irregular or random shape. In one embodiment, the covert flakes are distinguishable from bulk pigment flakes by their shape. Alternatively, bulk pigment flakes have a first selected shape, and the covert flakes have a second selected shape. Production of shaped pigment flakes is accomplished by a variety of techniques, such as using a patterned substrate to deposit the flake material on the substrate and then separating the flake from the substrate to obtain the pattern such as a frame or border. The selected shape of the covert flakes may be associated with a manufacturing facility, date of manufacture, or other aspect of the document 10, or ink used in producing the document, for example.

A roll coater is one type of apparatus that can be used to produce selectively shaped or randomly shaped covert flakes according to embodiments of the invention. A roll of a sheet of polymer substrate material (also known as a "web") is passed through a deposition zone(s) and coated with one or more thin film layers. Multiple passes of the roll of polymer substrate back and forth through the deposition zone(s) may be made. The thin film layer(s) is then separated from the polymer substrate and processed into flake. Other apparatus and techniques may be used.

It is generally desirable to limit the total thickness of thin film layers deposited (and hence removed) from a roll of polymer film substrate to less than about 10 microns. PET is one type of polymer film substrate used in roll coaters, and the PET film substrate is usually at least about 13 microns thick. Thinner PET film tends to thermally deform during vacuum deposition processes. Both the heat in the deposition zone and the heat of condensation of the deposited thin-film layer(s) increase the temperature of the polymer substrate as it passes through a deposition zone. Thus, the minimum thickness of flake cut from and incorporating PET film is about 13 microns.

Figure 10:
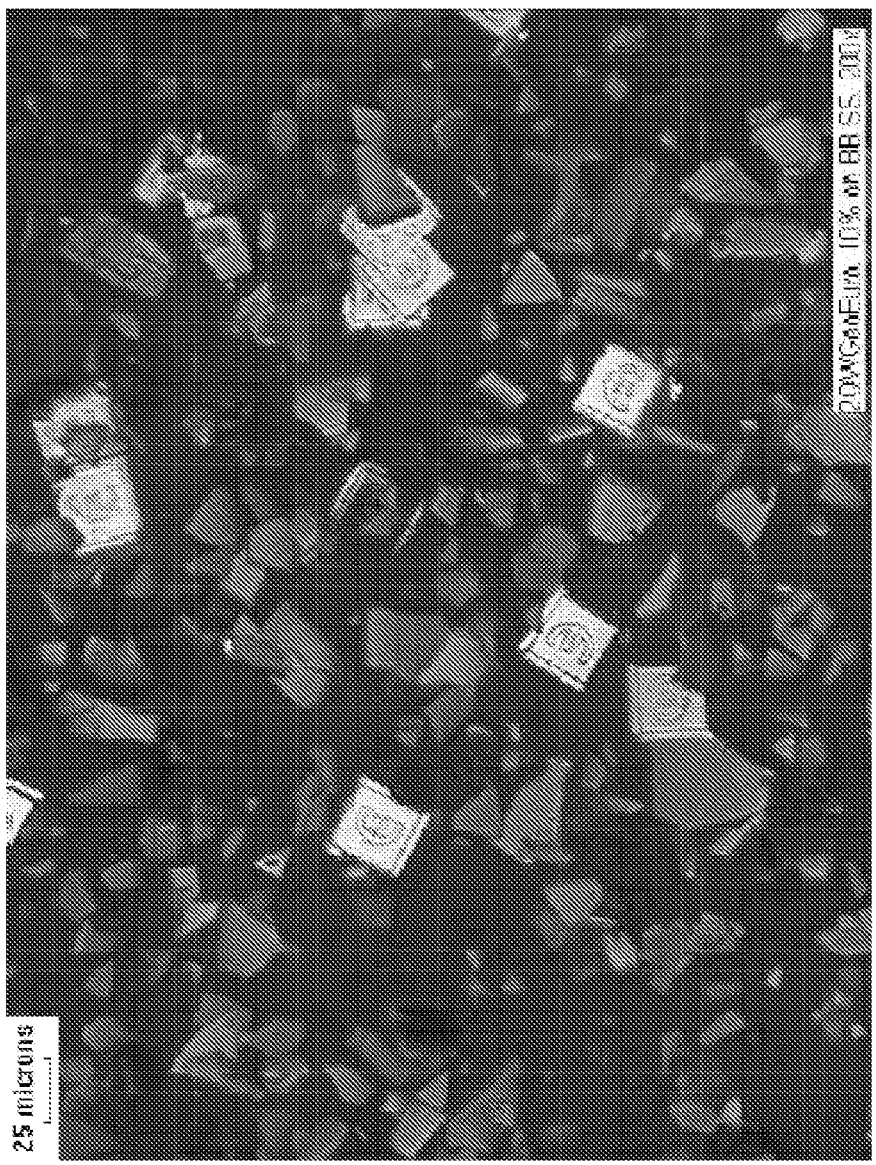
FIG. 10 is a photograph of a plurality of framed symbols within a greater number of flakes absent any covert symbols or frames where a ratio of framed symbols to other flakes is 1:10.

In addition to, flakes having a selected shape preferably realized by embossing frames into the substrate, along which the flakes will separate and break apart, the covert flakes preferably include a one or more symbols, other forms of indicia within and bordered by the frames, and/or a grating pattern. The grating pattern is embossed on a substrate used in a roll coater prior to depositing thin film layers that are processed into flakes, or otherwise formed. In a further embodiment, a selected amount (percentage) of the deposition substrate surface area is embossed with a grating pattern or shape pattern to obtain a selected amount of covert flakes when the thin film layers are stripped from the deposition substrate and processed into flakes. This technique provides covert flakes with the same optical design (thin film layer composition and thickness) as the base flake. For example, embossing 10% of the deposition substrate surface area with a grating pattern and/or shape pattern would result in a pigment mixture having about 10% covert flakes as is shown in FIG. 10. Different rolls of deposition substrate are produced with different percentages of embossed surface area to obtain pigment mixtures having different amounts covert flake, or are embossed with different patterns to obtain different shapes and/or grating patterns.

Figure 2A:
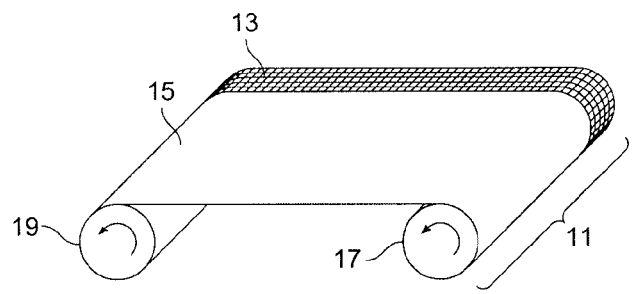
FIG. 2A is a simplified view of a portion of a deposition substrate having an embossed portion and a non-embossed portion.
Figure 2B:
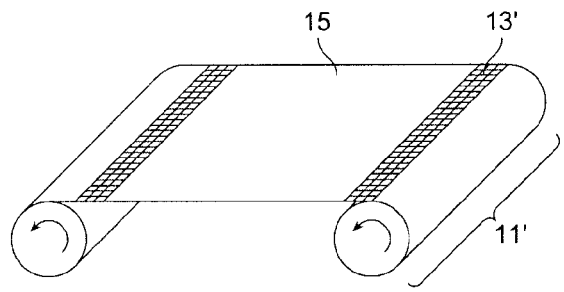
FIG. 2B is a simplified view of a portion of another deposition substrate 11' having an embossed portion 13' and a non-embossed portion 15'

FIG. 2A is a simplified view of a portion of a deposition substrate 11 having an embossed portion 13 and a non-embossed portion 15. The embossed portion has a frame, which is exaggerated for purposes of illustration, and alternatively or optionally has a grating or symbol, for example, and the non-embossed portion is essentially smooth. Alternatively, the non-embossed portion is embossed with a different frame, grating, or symbol. The ratio of the surface area of the embossed portion 13 to the non-embossed portion 15 produces a selected amount of taggent flake (produced from the embossed portion) having the same thin-film structure as the base flake (produced from the non-embossed portion). The deposition substrate 11 travels from one roll 17 to another 19 through a deposition zone (not shown) in a roll coater, but alternative embodiments use different types of substrates and deposition systems. FIG. 2B is a simplified view of a portion of another deposition substrate 11' having an embossed portion 13' and a non-embossed portion 15'.

A pigment flake with identifying indicia provides a security feature even if it is easily observable; however, if a pigment flake with identifying indicia is not easily observable, a counterfeiter might not even be aware that a covert flake is present. One embodiment of the present invention uses covert pigment flake that has the same optical characteristics as the base pigment. The covert pigment flakes are not seen by unaided human vision, but are visible under magnification of about 50× to 300×. Covert pigment flakes having essentially the same visual characteristics can be mixed with base pigment in a wide range of proportions without significantly affecting the color of the composition. In some embodiments, covert pigment flakes are readily identifiable in compositions having 5-10 weight % covert pigment flakes and 95-90 weight % base pigment flakes having similar appearance (e.g. color and/or color travel). Often, shaped opaque covert flakes are easily identifiable in the field using hand-held microscopes (e.g. "shirt-pocket" microscopes), and require less magnification to identify than similar sized flakes having symbols.

Another approach is to use an opaque covert flake with a selected shape that is a different color than the base flake. In one embodiment, the opaque covert flake is a bright metallic ("silver") flake having a thin-film layer of aluminum or other reflector between layers of a dielectric material, such as $MgF_2$. Bright flake is generally highly reflective over a wide range of visible wavelengths, and often does not have a characteristic color. Bright flake made with gold and copper may appear yellowish and reddish, for example. It has been found that between about 0.25 weight % to about 5 weight % of shaped (e.g. "diamond" shaped) bright flake in colored base pigments can be added without causing a noticeable change in color, but are still easily identifiable under illuminated magnification of about 50× (i.e. 50 times magnification). Under illuminated magnification, both the shape and high brightness of the flake distinguish it from the base flake. When less than about 0.25% of shaped bright flake is used the covert flakes become difficult to detect because dilution with the base flake results in fewer shaped bright flakes in the field of view.

When the amount of bright flake exceeds about 5 weight %, the color (e.g. hue) of certain types of flakes, particularly dark colored flakes, changes. In these instances, too much bright flake essentially "dilutes" the color of the base pigment. However, using shaped bright flake in compositions having color-shifting pigment is highly desirable because a single type of shaped bright flake is added in small quantities to many different types (color and/or color travel) of pigment flake, and a relatively small amount of shaped bright flake provides a covert security feature. Similarly, dilution of color is not critical in applications where compositions containing pigment and bright flake are not intended to replace or otherwise be indistinguishable from compositions containing 100% pigment flake.

Pigments are often mixed in carriers to form paint or ink Examples of carriers include polyvinyl alcohol, polyvinyl acetate polyvinylpyrrolidone, poly(ethoxyethylene), poly (methoxyethylene), poly(acrylic) acid, poly(acrylamide), poly(oxyethylene), poly(maleic anhydride), hydroxyethyl cellulose, cellulose acetate, poly(sacchrides) such as gum arabic and pectin, poly(acetals) such as polyvinylbutyral, poly(vinyl halides) such as polyvinyl chloride and polyvinylene chloride, poly(dienes) such as polybutadiene, poly (alkenes) such as polyethylene, poly(acrylates) such as polymethyl acrylate, poly(methacrylates) such as poly methylmethacrylate, poly(carbonates) such as poly(oxycarbonyl oxyhexamethylene, poly(esters) such as polyethylene terephthalate, poly(urethanes), poly(siloxanes), poly (suphides), poly(sulphones), poly(vinylnitriles), poly(acrylonitriles), poly(styrene), poly(phenylenes) such as poly(2, 5dihydroxy-1,4-phenyleneethylene), poly(amides), natural rubbers, formaldahyde resins, other polymers and mixtures of polymers and polymers with solvents.

Figure 3A:
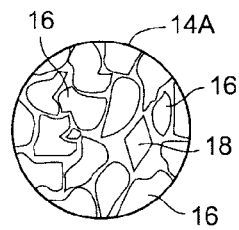
FIG. 3A is a simplified plan view of a portion 14A of the security feature 14 shown in FIG. 1.

FIG. 3A is a simplified plan view of a portion 14A of the security feature 14 shown in FIG. 1. The portion 14A of the security feature is viewed under magnification, typically about 20×-300×, in order to see the shape of the flakes, which are typically about 5-100 microns across, more typically about 20-40 microns across. The security feature was printed using ink including base pigment particles 16 and a covert pigment flake 18 having a selected shape, in this case a "diamond" shape. The optical characteristics and concentration of the covert pigment flake is chosen so as to not disturb the visual appearance of a composition made with the base pigment particles.

The base pigment particles 16 are illustrated as being irregularly shaped flakes. Alternatively, base pigment flakes have a selected (i.e. regular) shape. Similarly, the covert pigment flake 18 could have a grating. The addition of a grating further increases the difficulty of counterfeiting. In some embodiments, the covert pigment flake 18 has generally the same optical characteristics as the base pigment particles. Alternatively, the covert pigment flake 18 has different optical characteristics as the base pigment particles but is present in sufficiently small quantities so as not to disturb the visual appearance of a composition made with the base pigment particles.

In a particular embodiment, the "diamond-shaped" covert flakes were bright flakes about 25 microns by 35 microns across. The shaped flakes were made by embossing a diamond pattern into a roll of PET deposition substrate material, and then depositing a standard thin-film design for bright flake (e.g. about 100-60 nm of Al between layers of $MgF_2$ that are each about 400 nm thick). The total thickness for this bright flake is about 900 nm, which is about one micron. The embossed pattern is also known as a "frame" (as opposed to a grating which is intended to produce a pattern in or on the flake), and is positive in some embodiments and negative in other embodiments. Aside from the diamond flakes themselves offering some measure of a covert feature when distributed in some predetermined ratio with other irregular shaped flakes, the diamond-shaped flakes may be embossed with additional covert symbols, thereby providing two levels of covert features available to protect a device.

The combination of a metal layer with one or more dielectric layers facilitates removal of the flake from the deposition substrate. A thin film stack having only dielectric layers is brittle and often has residual stresses from the deposition process. Such thin film stacks tend to break more randomly, resulting in fewer shaped flakes. An all-metal stack or single layer is difficult to process into patterned flakes according to the frame of the deposition substrate because the metal is relatively ductile. In particular embodiments, metal-dielectric and dielectric-metal-dielectric flake having a total thickness of between about 0.5 microns and about 3 microns provides a good combination of ductile and brittle characteristics that result in good patterning of the flake when it is removed from the substrate and processed. In a particular embodiment, shaped bright flake having a total thickness of about one micron of a ductile metal layer between brittle dielectric layers yielded about 90% diamond-shaped flakes from an embossed deposition substrate.

The thin-film layers were stripped from the deposition substrate and processed into flake using conventional techniques. The embossed diamond pattern provided lines along which the thin-film layers broke into flakes having the selected diamond shape. In another embodiment, the diamond-shaped flakes were about 12 microns by 16 microns and included a grating on the major surface of the flakes. The grating was nominally 2000 lines/mm and did not produce a noticeable diffractive effect in a composition when used as a taggent. The shape of the 12-by-16 micron flake was easily seen at 100× magnification; however, the grating was not easily seen at this magnification. The grating was readily apparent at 400× magnification. In other embodiments, a grating is coarser, and is easily seen at the same magnification (e.g. 50× to 100×) that is used to discern the shape of the taggent flakes. Thus, gratings used to provide a security feature to taggent flakes do not have to be optically active in the visible portion of the spectrum.

In a particular embodiment, the base pigment particles are flakes of mica coated with a layer of $TiO_2$ or other dielectric material. The coating material typically has a relatively high index of refraction. Mica is a naturally occurring mineral that is relatively inexpensive and easily processed into flake substrate. When mica flake substrate is coated with a layer of high-index material of a selected thickness, a nacreous pigment flake is obtained. Mica flake substrate can be coated with several alternative materials using a variety of processes. Such pigments are commonly known as "mica-based" pigments. A photocopy of an image printed with such nacreous pigment does not look like the original, thus mica-based pigment flakes are desirable for use to provide overt security features. However, shaping mica flake substrate or providing a symbol on mica flake substrate is impractical. Covert flake according to an embodiment of the present invention is mixed with the mica-based pigment to enable a covert security feature to be included in images printed with mica-based pigment flakes. Shaped pigment flakes made of a single layer of inorganic dielectric material, such as $TiO_2$ or ZnS, have an appearance similar to a mica-based pigment if the covert pigment flake has a thickness about five times the quarter-wave optical thickness ("QWOT") at a wavelength in the visible spectrum. Typically, a single-layer covert flake of ZnS intended to match the appearance of a mica-based pigment has a thickness of about 60 nm to about 600 nm. Processing all-dielectric flake from a deposition substrate having an embossed diamond-shaped pattern tends to have a lower yield than a counterpart metal-dielectric flake.

Figure 3B:
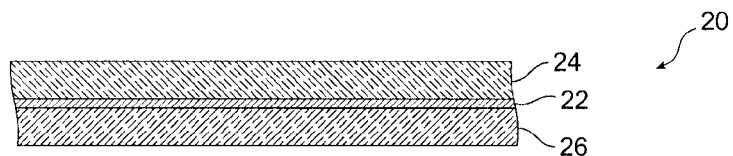
FIG. 3B is a simplified cross section of a bright pigment flake 20 according to an embodiment of the present invention.

FIG. 3B is a simplified cross section of a bright pigment flake 20 according to an embodiment of the present invention. A reflective layer 22 is between two dielectric thin-film layers 24, 26. The dielectric thin-film layers 24, 26, provide stiffness to the bright pigment flake 20 and facilitate removal of the pigment flake from the roll coater substrate. It is desirable to keep the bright pigment flake less than 10 microns thick to provide a composition that dries or cures to a smooth surface. In particular embodiments, the thickness of the flake is between about 1 micron and about 3 microns. Thinner flakes tend to be more difficult to process and handle because they weigh so little, and thicker flakes are stronger, and hence more difficult to break along the frame pattern.

The reflective layer 22 is typically a thin-film layer of a highly reflective metal such as aluminum, platinum, gold, silver, or copper, or a moderately reflective metal, such as iron or chromium. The reflective layer 22 is sufficiently thick to be opaque (reflective) in the visible portion of the spectrum, but not so thick as to interfere with separation of the thin-film layers from the substrate and subsequent processing into flake. In other words, a metal reflective layer that was too thick would provide a ductile layer between the relatively brittle dielectric layers 24, 26 and tend to interfere with processing the deposited layers into flakes. Suitable materials for the dielectric layers include ZnS, $MgF_2$, $SiO_2$, $Al_2O_3$, $TiO_2$, $Nb_2O_5$, and $Ta_2O_5$, among others. In some embodiments, the dielectric thin-film layers 24, 26 also provide environmental protection for the reflective layer 22.

The bright flake 20 has a selected shape, and optionally or alternatively has other indicia, such as a surface (grating) pattern or an elemental fingerprint. In sufficiently low concentrations, the bright flake 20 is added to colored pigment and colored compositions (e.g. inks and paints). Shaped bright flake can be added to base (i.e. randomly shaped or alternatively shaped) bright flake as a covert security feature.

Figure 3C:
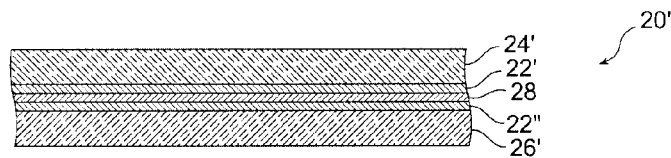
FIG. 3C is a simplified cross section of a bright flake 20' providing an elemental fingerprint.

FIG. 3C is a simplified cross section of a bright flake 20' with an elemental indicator layer 28. The bright flake 20' has reflective layers 22', 22" between dielectric layers 24', 26', and a layer 28 providing an elemental indicator. The elemental indicator layer 28 is a layer of material that is not found in a base pigment that the bright flake will be used with, and that is readily detectable using elemental analysis techniques, such as secondary ion mass spectrometry ("SIMS"), energy dispersive X-ray ("EDX") and Auger analysis. Furthermore, the elemental indicator is present in the covert flake but not in the base flake, and micro-SIMS, micro-EDX or micro-Auger analysis easily detects this difference. Merely adding the indicating element to the pigment mixture (e.g. adding a small amount of a compound containing the indicating element to the carrier) would not overcome this security feature.

The elemental indicator layer 28 is not optically active because it is between the two opaque reflective layers 22', 22". The reflective layers 22', 22" are selected to be of the same material used in the base flake, such as aluminum. Suitable materials for an elemental indicator include platinum, iridium, osmium, vanadium, cobalt, and tungsten, among others. Those of skill in the art appreciate that the elemental indicator material chosen depends on the base pigment it will be used with. In an alternative embodiment, the reflective layer of bright pigment is of an elemental indicator material (see FIG. 3B, ref. num. 22). For example, covert bright or colored pigment flake using platinum as the reflective layer is mixed with base bright flake or colored pigment flake using aluminum as the reflective layer. In a further embodiment, the amount of flake having the elemental indicator incorporated into a pigment mixture or composition is chosen to provide a selected elemental ratio (e.g. aluminum to platinum) in the pigment mixture. In an alternative or further embodiment, the material of the dielectric thin-film layers 24', 26' (FIG. 3B, ref. nums. 24, 26) is chosen to provide an elemental indicator.

Figure 3D:
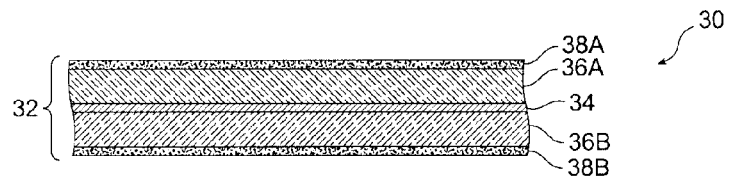
FIG. 3D is a simplified cross section of a color-shifting pigment flake 30 according to another embodiment of the present invention.

FIG. 3D is a simplified cross section of a color-shifting pigment flake 30 according to another embodiment of the present invention. The color-shifting pigment flake 30 is generally known as a symmetrical 5-layer Fabry-Perot interference flake. A thin film stack 32 includes a reflective metal layer 34, two spacer layers 36A, 36B, and two absorber layers 38A, 38B. The absorber layers are typically very thin, semi-opaque layers of chromium, carbon, or other material. The reflector, spacer, and absorber layers are all optically active, that is, they contribute to the optical performance of the color-shifting pigment flake. Each side of the flake provides similar Fabry-Perot interference structures to incident light, and hence the flake is optically symmetrical. Alternatively, the color-shifting pigment flake is an all-dielectric pigment flake or a 3 layer flake such as an absorber/dielectric/absorber.

The color and color travel of the color-shifting pigment flake is determined by the optical design of the flake, namely the material and thicknesses of the layers in the thin film stack 32, as is well-known in the art of optically variable pigments. The optical design of the color-shifting pigment flake 30 is typically chosen to match the optical properties of the base pigment flake that it will be mixed with. The color-shifting pigment flake 30 is shaped (see FIG. 3A, ref. num. 18), and optionally or alternatively includes other indicia, such as a surface grating pattern and/or elemental indicator.

For example, the reflective layer includes an elemental indicator, either a reflective metal that is different than the base pigment flakes, or includes an additional elemental indicator layer(s), which may or may not be optically active (see FIG. 3C, ref. num. 28). Alternatively or additionally, the spacer layers 36A, 36B and/or the absorber layers 38A, 38B include an elemental indicator. For example, if the base pigment flake uses $MgF_2$, $SiO_2$, or $Al_2O_3$ as a spacer layer material, the covert pigment flake 30 uses different spacer layer material, such as $TiO_2$ or ZnS. Spacer and/or absorber indicator materials include elements that are easily detected using elemental analysis.

In some embodiments, using a different spacer material and/or reflector material results in a covert pigment flake 30 that has different optical properties than the base flake. For example, even if the covert and base flakes have similar color at normal incidence, the color travel might be different. Generally, low-index spacer materials (such as $MgF_2$ and $SiO_2$) provide more color travel ("fast shifting" pigments) than high-index spacer materials (such as ZnS and $TiO_2$). However, such covert flakes can be added in relatively high concentrations to the base pigment flake, even if the color travel does not precisely match that of the base flake, because most casual observers cannot detect the difference between a mixture according to an embodiment of the invention and 100% base flake.

Figure 4:
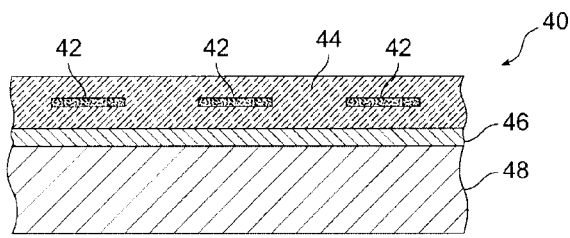
FIG. 4 is a cross section of a varnish with opaque covert flakes dispersed in a carrier according to an embodiment of the present invention.

FIG. 4 is a cross section of a varnish 40 with covert flakes 42 dispersed in a carrier 44 according to an embodiment of the present invention. The carrier is clear or tinted, and the covert flakes 42 are at a concentration selected to avoid casual visual detection. An optional color coat or bright (e.g. "chromed") coating 46 has been applied to an object 48 underneath the varnish 40. The varnish 40 provides a covert security feature to the object without disturbing its appearance. In a particular embodiment, the optional color coat 46 is an image printed with nacreous or color-shifting pigment to provide an overt security feature to the object. The object is a document, product, packaging, or seal, for example. The varnish 40 enables providing a covert security feature to an object that already has a covert security feature without significantly altering the appearance of the object. For example, if stock certificates have been printed with overt security features and it subsequently becomes desirable to provide a covert security feature to the stock certificates, the overt security feature is overprinted with the varnish 40 or a similar ink composition (i.e. an essentially clear ink composition containing covert flakes). In another embodiment, an additional covert security feature is provided to an object already having one or more covert security features. In a particular embodiment, the covert flakes make up not more than 2% of the varnish.

Figure 5:
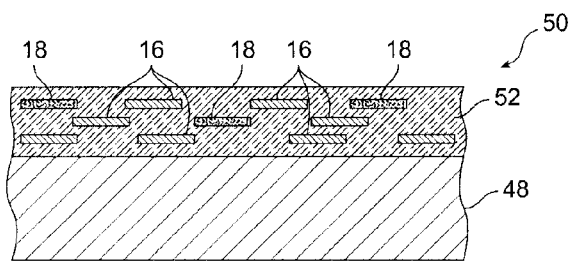
FIG. 5 is a cross section of base flakes and opaque covert flakes dispersed in a binder according to another embodiment of the present invention.

FIG. 5 is a cross section of a composition 50 (e.g. ink or paint) including base pigment flakes 16 and shaped covert flakes 18 dispersed in a binder or carrier 52 according to another embodiment of the present invention. The covert flakes 18 have a selected shape or other indicia, such as an elemental indicator or a surface grating pattern. The composition 50 has been applied to an object 48, such as a label, product packaging, bank note, or consumer item.

Adding covert flake to an existing ink or paint composition provides a covert security feature to images made of the ink or paint. For example, ink with color-shifting pigment is used to provide a color-shifting image as an overt security feature on a bank note or other object. Covert flake according to an embodiment of the present invention is added to the ink, and the resultant mixture is used to print images that appear substantially similar as those printed with the original ink. Thus, a casual observer of the bank note does not notice a change in the appearance of the overt security feature (i.e. color-shifting image) after the covert security feature is added. The indicia of the covert flake indicates a date-of-manufacture, a printing location, and/or the source (manufacturer) of the ink, for example.

III. Experimental Results

A test standard using 100% magenta-to-green optically variable intaglio ("OVI") pigment flake was produced and measured. Both bright and optically variable taggent samples had a grating pattern of 2000 lines/mm, which made the taggent flakes easier to distinguish from the base pigment flake (i.e. locate) and more difficult to counterfeit. The grating pattern was clearly visible at about 400×, and did not induce visible diffractive properties to images printed with the test compositions. It is believed that the low portion of the taggent flakes in combination with not being well oriented to the viewer avoided a diffractive effect from occurring. In an alternative embodiment, a finer grating pattern is included on shaped taggent flakes. The shapes are identifiable under a microscope at a first magnification, but the grating pattern is not easily seen at this first magnification. The grating pattern is seen at a higher magnification. It is believed that including such a grating pattern to taggent flake having a selected shape or symbol further enhances the covert nature of the taggent flake because a counterfeiter might see the shape or a symbol under microscopic examination, but not see the grating pattern, and hence not include it in a counterfeit article.

The first test sample ("sample 1") contained 90% (by weight) of the conventional (base) magenta-to-green pigment flake mixed with 10% magenta-to-green OVI pigment flake with a grating ("taggent flake"). The taggent flakes were easy to detect by routine microscopic inspection, and the color performance of the mixture was the same as the test standard because the color of the taggent flake was well matched to the color of the base flake. Close color matching involves careful monitoring of the production of the taggent flake and a new optical design for each color of taggent flake would generally be used to match each color of base flake.

Another approach is to use a standard taggent flake design that can be used with many different colors of base flake. Bright taggent flake using an aluminum reflector layer (giving the flake a "silver" appearance) was also evaluated. Fabrication of bright flake is relatively simple and these flakes were very easy to detect at a concentration of 5% when mixed with colored base pigment flakes. Bright taggent flakes are used with many colors of base pigment to provide covet security features. The amount of bright taggent flakes in the composition depends on the desired result. For example, the color performance of an intaglio blend containing 5% bright taggent flake mixed with the magenta-to-green OVI base is distinguishable in a side-by-side comparison from a composition of 100% magenta-to-green OVI flake. A composition essentially indistinguishable from 100% magenta-to-green OVI flake uses less than 5% bright flake, such as compositions with concentrations between about 0.25 weight % and 3 weight % of bright taggent flake in magenta-to-green OVI flake. It is believed that bright flake in concentrations greater than 5% may be added to pigment flake providing lighter or less saturated color without noticeably changing the appearance of the composition. Bright taggent flakes are easy to detect under modest magnification, even at concentrations below 1%, because of the combination of having a selected shape and of being a different color (e.g. "silver" instead of magenta).

IV. Exemplary Methods

Figure 6:
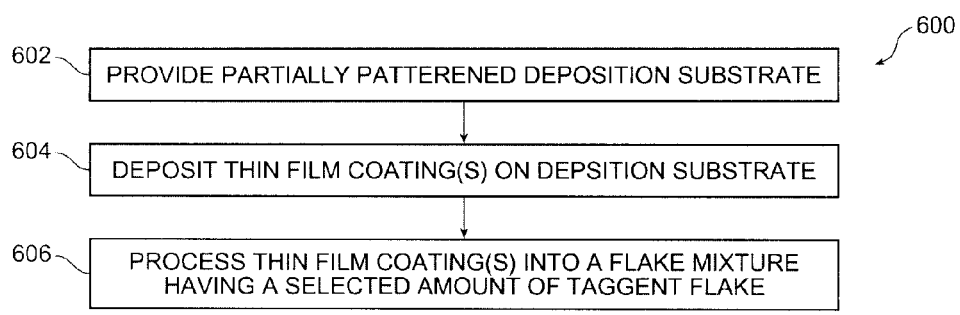
FIG. 6 is a flow chart of a method of making pigment flake according to an embodiment of the present invention.

FIG. 6 is a flow chart of a method 600 of making pigment flake according to an embodiment of the present invention. A roll substrate having a non-embossed ("smooth") portion and an embossed portion in a selected ratio of the deposition surface area of the roll substrate is provided (step 602). In one embodiment, the embossed portion is embossed with a frame for producing flakes having a selected shape. In an alternative embodiment, the embossed portion is embossed with a grating pattern or symbol. In an alternative embodiment, the substrate is patterned using a process other than embossing, such as laser ablation. At least one thin film layer is deposited on the roll substrate (step 604), and the deposited thin film layer(s) is processed into flake (step 606) to result in a flake mixture having a selected amount of taggent flakes. The yield of taggent flake depends on factors such as the type of thin-film layers being processed, the nature of the frame, grating pattern, or symbol, and processing parameters.

For example, referring to FIGS. 2A and 2B, if 10% of the surface of the roll substrate is embossed with a grating or symbol, then a yield of approximately 10% taggent flake having the grating pattern or symbol is expected. If 10% of the surface of the roll substrate is embossed with a diamond-shaped frame, then a yield of about 9% is expected for dielectric-metal-dielectric flake because of the 10% yield loss processing the patterned portion of the thin film stack into shaped flakes. Similarly, a yield of about 5% is expected for shaped all-dielectric flake because of the 50% yield loss processing the patterned portion of the thin film stack into shaped flakes.

While the invention has been described above in terms of various specific embodiments, an aspect of the invention which provides significant advantages will now be described.

For example an embodiment of this invention which offers significant advantages is the aspect of using frames or borders framing symbols or indicia framed by these borders on a substrate material used to form a coating upon.

Figure 7:
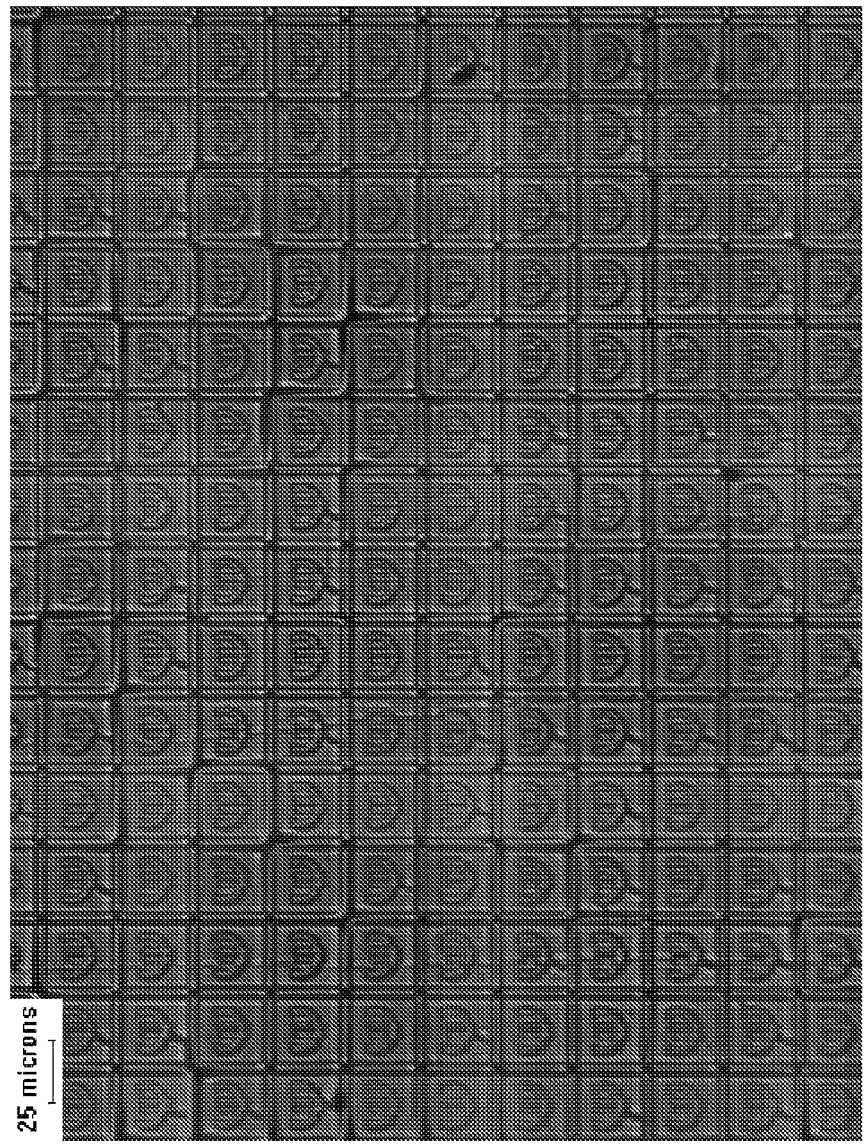
FIG. 7 is a photograph of a sheet bearing a plurality of Euro symbols each framed by a square frame or border embossed into the substrate.
Figure 8:
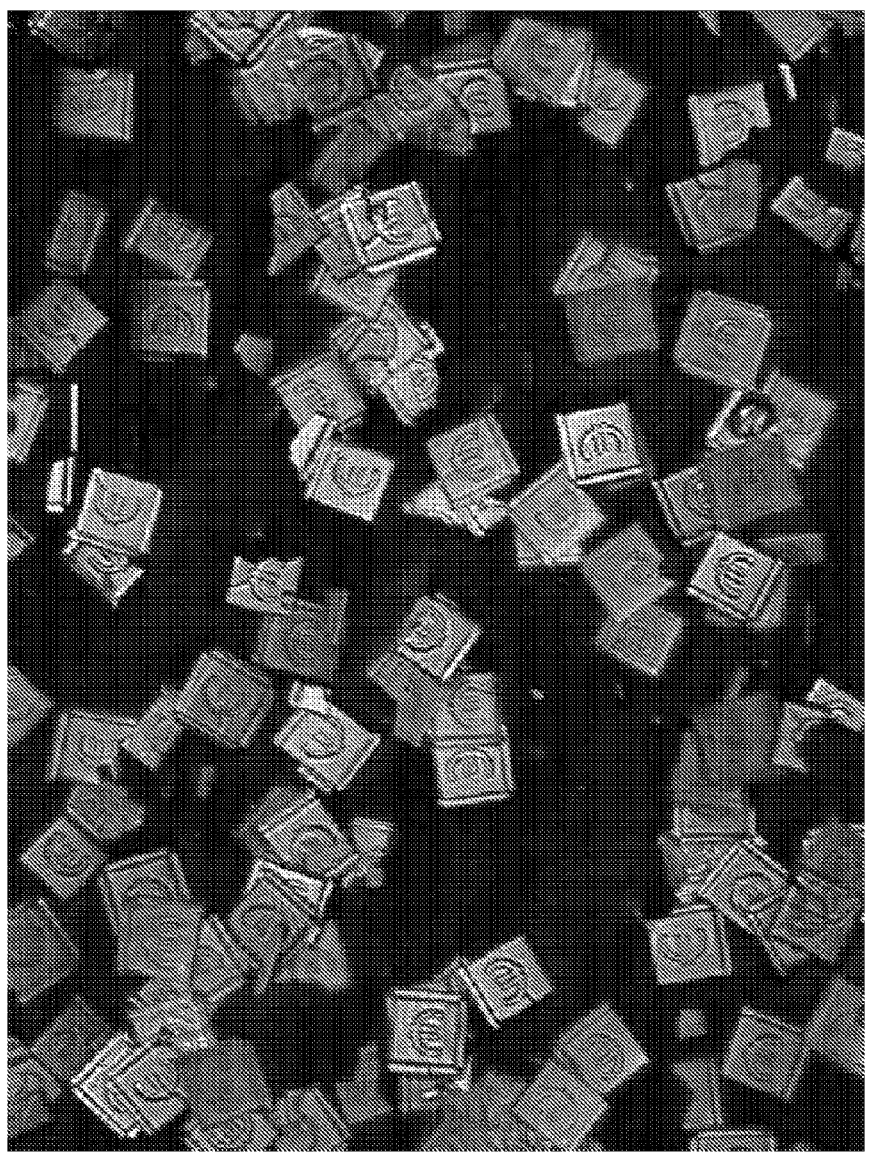
FIG. 8 is a photograph of a plurality of Mg-Gn color shifting flakes each bearing the Euro symbol and most having a full or partial frame surrounding the symbol.

Turning now to FIG. 7, a photograph is shown of sheet bearing a plurality of Euro symbols wherein each € symbol on the sheet has an embossed border around it. This is generally accomplished by embossing an organic substrate, such as a PET substrate with the framed € symbols, and subsequently coating the substrate with a removable coating. FIG. 8 is a photograph of the flakes after separation from their backing or substrate. This photograph clearly shows most of the symbols to be intact with few cracks appearing into or through the symbols. By using this invention, a very small portion of the flakes in the figure are broken in such a manner as to obscure the € symbol. However what is shown is that the frames are not present along all sides of all flakes after the flakes break apart from the substrate they were deposited on. Some flakes have no borders and others may have one and up to four borders. However, this is understandable. Since a frame border separates the flake from its nearest neighbour, when the flakes separate the border generally remains attached to one flake an not its adjacent flake on the other side of that frame border. However the existence of the frame or border results in most of the flakes breaking upon frame lines, on one side of the frame or the other providing relatively uniform flakes with relatively straight edges. More often than not, each flake bearing a symbol will have at least one border or frame segment attached to it after separating from the web or substrate it was deposited on.

FIGS. 7 to 13 were filed in color as part of U.S. Ser. No. 11/243,122 filed Oct. 4, 2005, now issued as U.S. Pat. No. 7,645,510, of which the present application claims priority.

Figure 9:
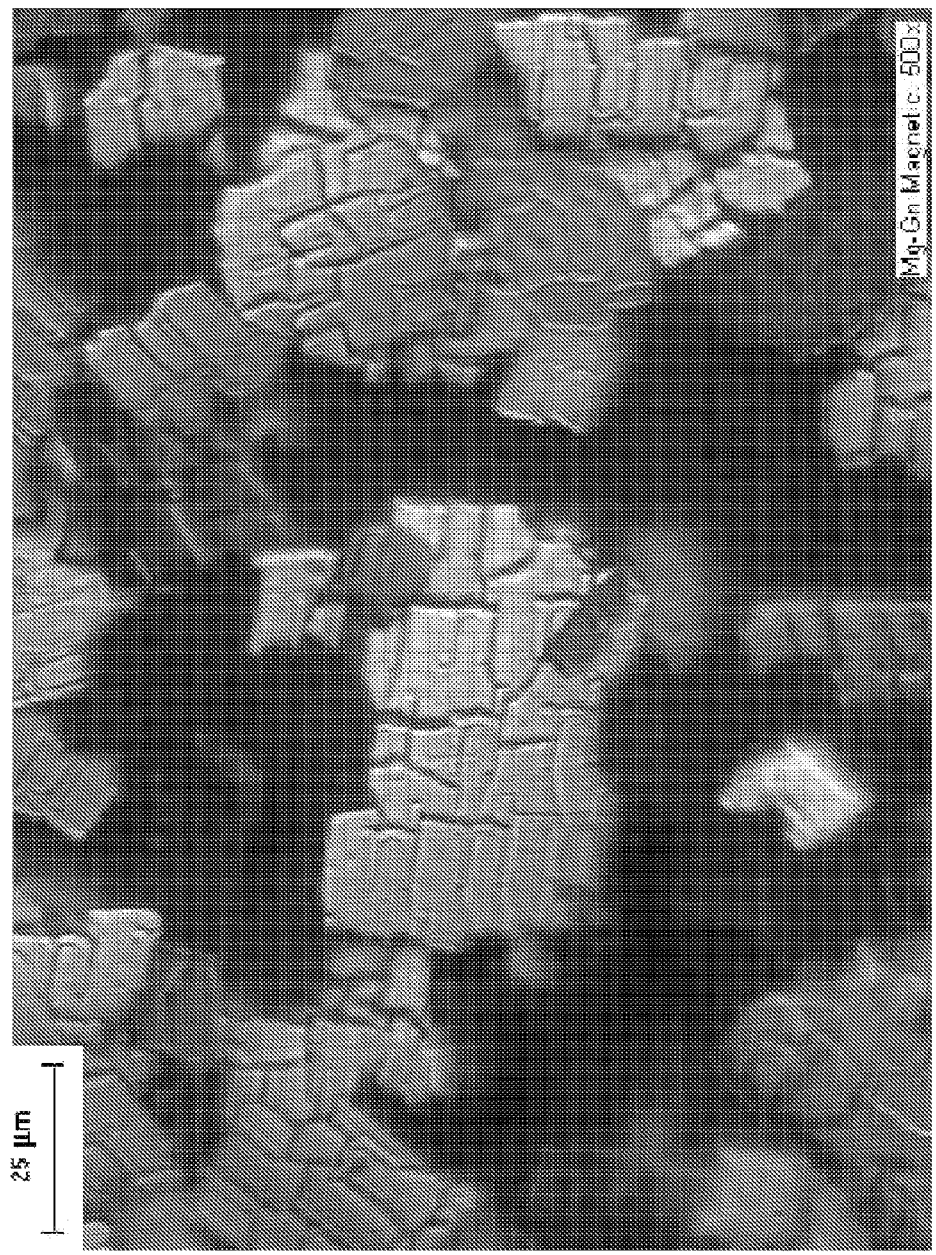
FIG. 9 is a photograph of a plurality of Mg-Gn µ symbols on flakes wherein the flakes have broken randomly preserving some symbols and destroying others due to the fracture lines as a result of the absence of frames.

FIG. 9 is a photograph of a plurality of Mg-Gn flakes bearing µ symbols wherein the flakes have broken randomly preserving some symbols and destroying others, due to stress cracks and resulting apparently random fracture lines as a result of the absence of frames. FIG. 9 illustrates stress cracks throughout the flakes causing the flakes to separate as a function of these cracks. Furthermore, cracks continue to appear within flakes thereby obscuring symbols. The provision of frames in accordance with this invention does not entirely prevent stress cracks, however provides a means in which these cracks can be controlled to a greater extent, so as to occur or be preferentially routed along the frame lines. In contrast to FIG. 9, the embodiment of this invention shown in conjunction with FIGS. 7 and 8 offers a manner in which the flakes can be separated along predetermined borders thereby preserving the shape and integrity of the symbols on the flakes to a much higher degree and generally does obscure the covert symbol within the flake.

The cracks that do appear in the non-framed symbols appear and propagate in the more fragile, glass-like, dielectric material but are stopped and rerouted to continue their propagation along the frame lines provided in the sheet of framed symbols shown in FIG. 7. The provision of frames produces the preferential rupture of the flakes along frame lines. Most of the cracks observed in the flakes of FIG. 8 do not go all the way through the total thickness of the flakes, but are stopped at the level of the more elastic metallic core (Al/Ni/Al) of the flakes producing a shadowing effect detrimental to the readability of the originally embossed symbols.

The flakes in both FIGS. 8 and 9 are about 1300 nm or 1.3 microns in thickness and have a layer structure of 10 nm Cr/480 nm MgF2/80 nm Al/50 nm Ni/80 nm Al 480 nm MgF2/10 nm Cr. Ni is present to provide the magnetic layer for overt features.

Turning now to FIG. 10 is a photograph of a plurality of framed symbols within a greater number of flakes absent any covert symbols or frames where a ratio of framed symbols to other flakes is 1:10. There are two interesting aspects of this embodiment. On a first level of detection, one, equipped with a 100× hand held microscope can detect the presence of covert flakes with a Euro symbol thereon, and furthermore, one can also quickly approximate that the ratio of covert to non-covert symbols is about 1:10. Yet still further, one can compare the ratio of square symbols to randomly shaped flakes to provide some measure of authentication. Therefore, shape, distribution, and identification of the symbols within framed shapes can be used to determine if the coating is authentic within some range of assurance.

Figure 11:
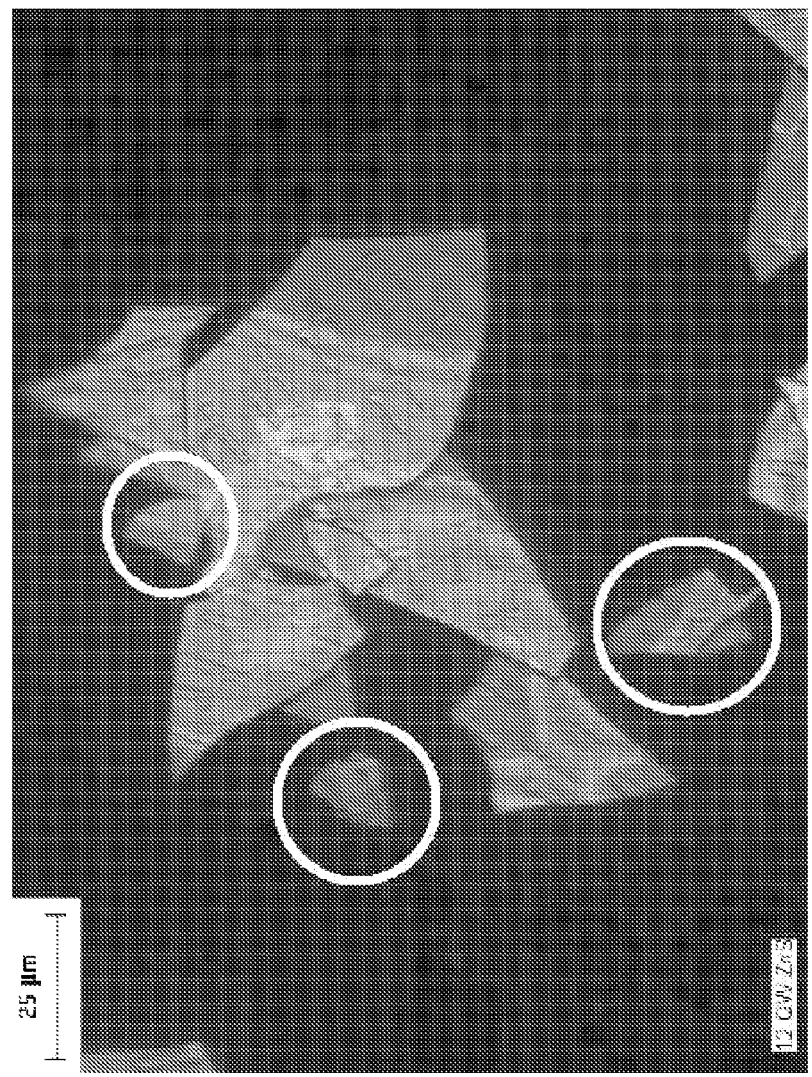
FIG. 11 is a photograph of a plurality of µ symbols some of which are cracked through the symbols and some of which have plural symbols on a single flake; the great distribution in particle size is evidenced here in this photograph due to the absence of providing frames or borders about the symbols.

FIG. 11 is a close-up detailed photograph of a plurality of µ symbols some of which are cracked through the symbols and some of which have plural symbols on a single flake; the great distribution in particle size is evidenced here in this photograph due to the absence of providing frames or borders about the symbols.

Figure 12:
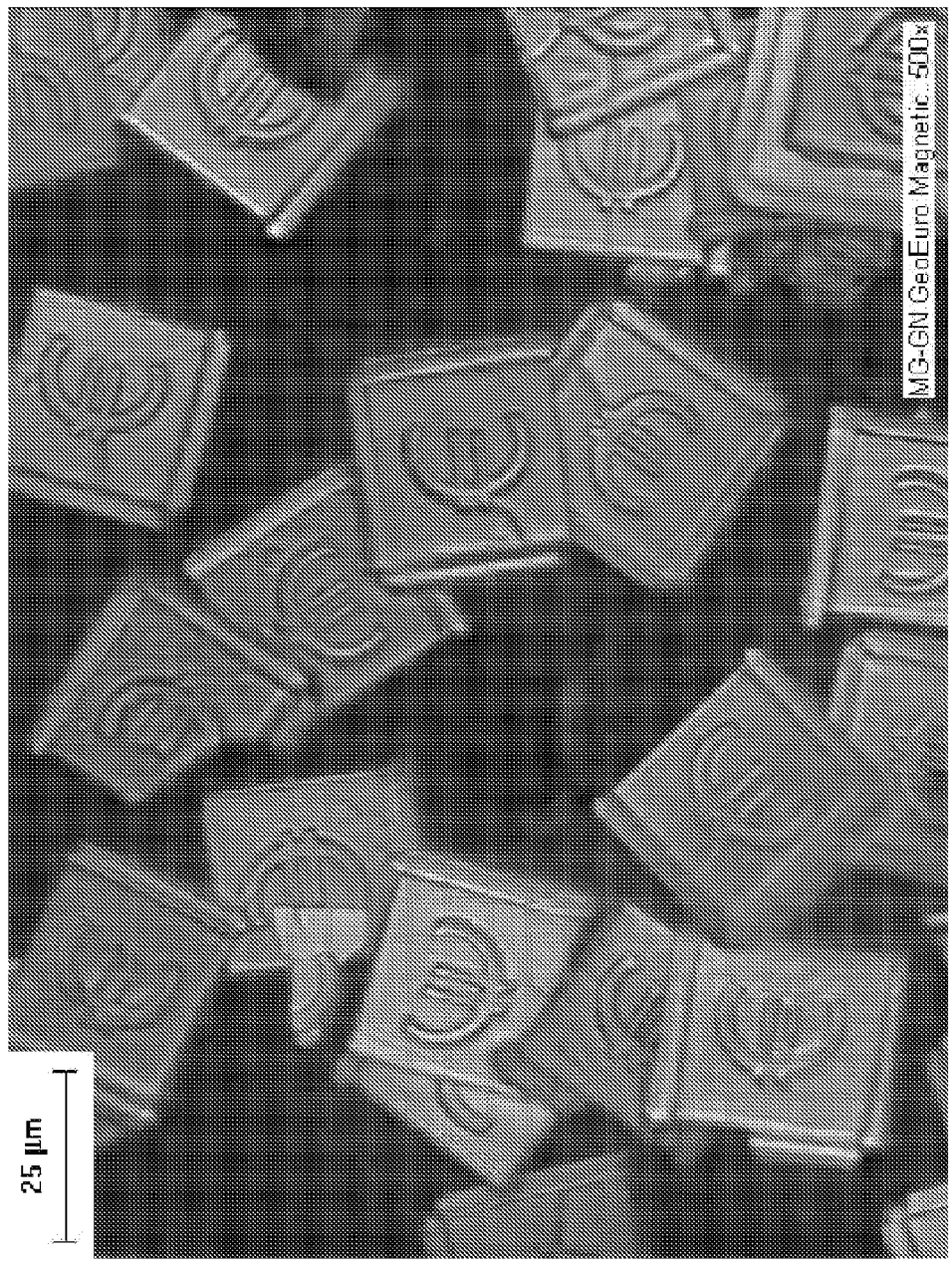
FIG. 12 is an embodiment in accordance with this invention wherein a flake has color shifting properties, magnetic properties, and bears a covert feature within the flake.

FIG. 12 illustrates an embodiment in accordance with this invention wherein a flake has color shifting properties, magnetic properties, and bears a covert feature within the flake. Preferably the flake is also bordered by a frame to preserve its shape.

Turning now to FIG. 12, a pigment flake is shown having a magnetic layer sandwiched between two aluminum reflective layers. Each of the aluminum layers in addition to an absorber and dielectric layer provide color shifting layers on each side. Within the flake is stamped a covert "euro" symbol thereon which can be seen with suitable magnification. The embodiment shown in FIG. 13 utilizes a plurality of the flakes shown in FIG. 12 to provide a security features that are both covert and overt.

Figure 13:
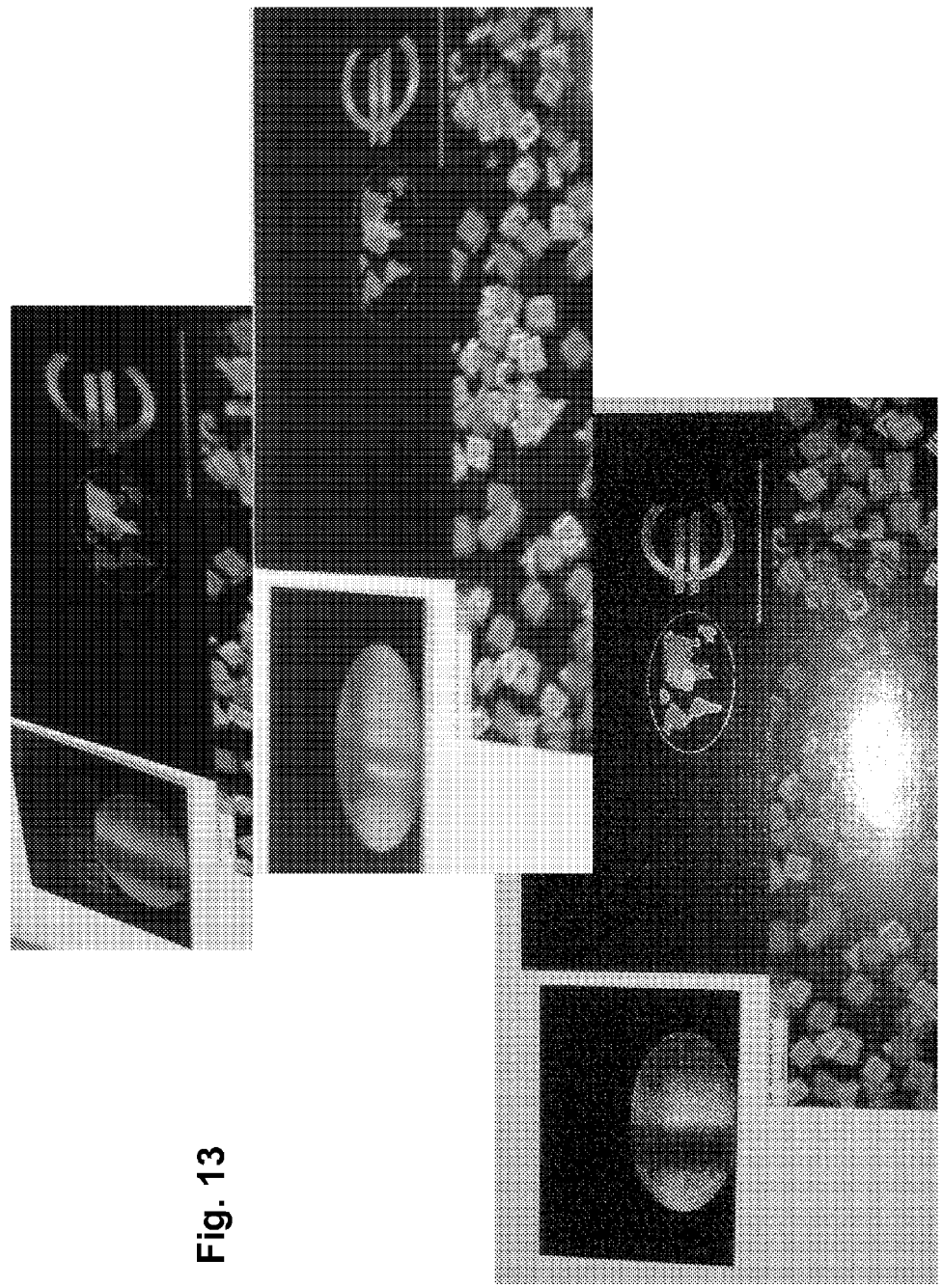
FIG. 13 is a photograph of security features wherein covert flakes are aligned to provide an overt security feature bearing the covert feature within flakes.

The covert and overt features are illustrated in the photograph which is a compilation of 3 photographs depicted by FIG. 13 where a large Euro symbol and a map of the continents are shown on the upper right in the photograph and wherein a globe is shown on the upper left of the photograph printed by silk screen in the presence of magnetic fields to create different visual contrasts (rolling bar effect) in addition to the standard green to magenta color shifting.

In this instance the covert framed square flakes of about 30 microns in size bear a Euro symbol about 17 microns across.

Of course other optical designs, magnetic or non-magnetic, shapes or symbols can be created as desired. By using the layer structure of the flake in FIG. 12, optically variable, special magnetically alignable, and covert feature can be provided within a same security device.

By using frames in accordance with the teachings of this invention, particular shapes having preferential side benefits may be utilized. For example, if the flakes are rectangular in shape, instead of being square, preferentially orientation of the symbols can be achieved, using magnetic shape anisotropy inherent of elongated flakes. Thus by providing a magnetic layer, for example of Ni, and ensuring that the flakes separate as elongate flakes due to the frames being designed I this manner, the flakes can be aligned as a function of their shape, and the symbols may have a preferential orientation, or be more likely to orient by this process.

Figure 14A:
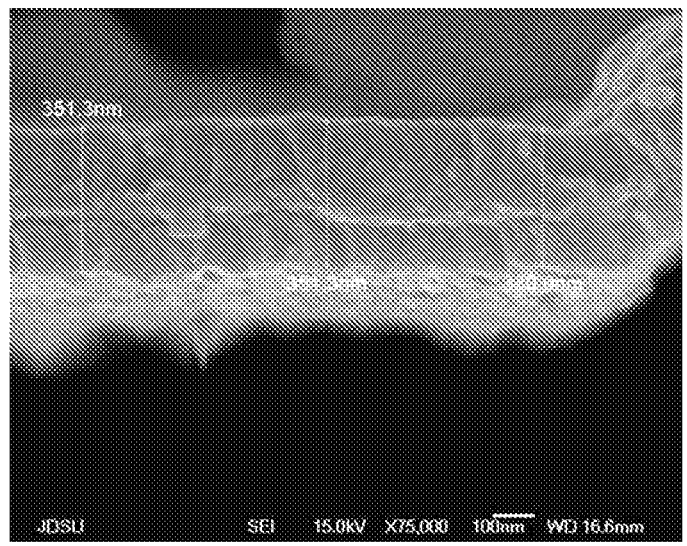
FIGS. 14a and 14b are micro-photographs of a cross section of a flake having a frame with a thinner cross-section in one region as shown.
Figure 14B:
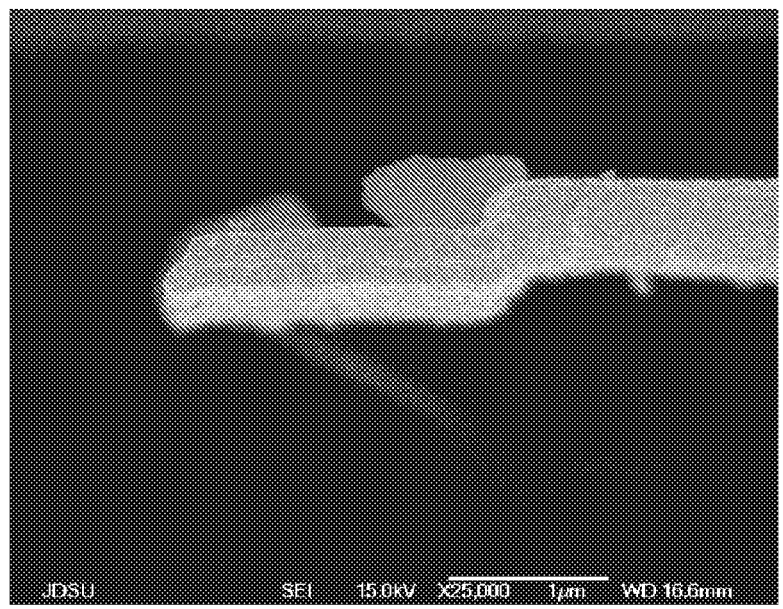

Referring now to FIGS. 14a and 14b a cross section of a flake having a frame is shown wherein a thinner region with a bend has a thinner cross-section than the rest of the flake. The flake tends to break where the cross-section is thinner than the average cross-section of the flake, as this thinner region facilitates breakage.

Thus, the embodiments described above illustrate the invention, but are not restrictive of the invention, which is indicated by the following claims. All modifications and equivalents that come within the meaning and range of the claims are included within their scope.

Although preferred embodiments of the invention relate to pigment flakes, it is possible to use a non-symmetrical flake having features on one side such as optically variable features. In this instance, approximately half of the flakes when examined will show the covert feature and other optical features, and the other half will not appear the same due to a lack of symmetry within a flake. Notwithstanding, this may still offer a reasonable covert security feature which can be used to authenticate.

In embodiments of this invention, shaped flakes can be made by other methods that are similar in one respect to the provision of frames, but which provide useful manufacturing alternatives. For example, U.S. patent application Ser. No. 11/931,816 now published U.S. Application 20080107856 from which this application claims priority teaches the provision of forming a substrate or stamping a substrate so as to be frameless but to have walls which facilitate flakes breaking along predetermined boundaries. U.S. patent application Ser. No. 12/463,114 now published U.S. Application 20090217842 from which this application claims priority teaches the provision of a stamped substrate that has a postage-stamp like embossing that facilitates breakage of the flake along predetermined boundaries. All of these embodiments have a same result which is facilitating flakes to break in predetermined polygonal shapes and we believe the means in which this is done is by providing a thinner region along a boundary of flake; for example a frame or a wall or a linear embossing provided facilitates breaking in a controlled manner along lines of thinner material than other thicker regions adjacent thereto. When the flakes are broken, each edge will upon high magnification show evidence of being broken by being somewhat jagged as opposed to a straighter edge that would be produced by cutting. When the flakes of this invention are magnified with sufficient magnification to determine the shape by visually inspecting the flakes, the selected shaped flakes are recognizable as being a same selected shape, however upon closer inspection and with significantly higher magnification, differences are seen along edges of different flakes, and often even edges of the same flake vary from one another. Due to the thinning of the edge, and forces applied in breaking the flakes, the break lines may appear slightly jagged or have a cleaved appearance. In almost all cases there will also be a remnant of a wall remaining.

Figures 15A, 15B, 15C:
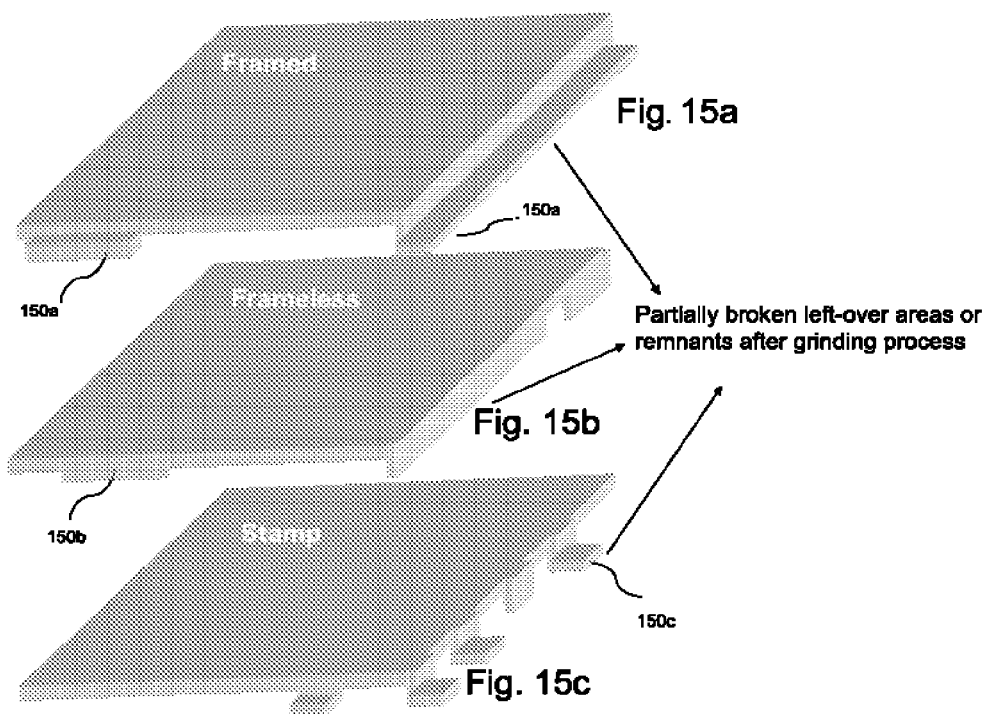
FIGS. 15a, 15b and 15c are illustrations of flakes having different forms of remnants on more than on edge as a result of a breaking or grinding process.

Referring now to FIG. 15a substantially planar flakes having at least one planar side are show, wherein a flake has remnants 150a of a frame shown along two edges. As was described heretofore, the provisional of a frame facilitates breakage. Notwithstanding, due to the grinding and breaking process almost all shaped flakes will have some remnants of the frame wall. In FIG. 15b a remnant 150b is shown in the form of an upstanding wall that was provided to facilitate breakage of the flake about or along the wall edge. In nearly all instances the breakage of the coating on the substrate will provide shaped flakes of a preselected shape, however in most instances there will be one or more remnants of a wall along one or more edges of the flake. FIG. 15c illustrates a shaped flake that was made using the postage-stamp method described heretofore. Once again, at least a remnant of a wall 150c is present along two edges, as shown. Fortunately, these remnants are so small, that when just enough magnification is used to see the shaped flake, these remnants are barely visible and don't significantly detract from the appearance of the shaped flake. Since the remnants are of different forms, depending on the particular feature provided to facilitate breakage, one can identify the flakes in accordance with the feature. For example another way in which security is added to the flake, is that one can identify if it was made by using frames, or walls or the postage stamp like feature to facilitate breakage. These remnants form a type of recognizable signature.

What is claimed is:

1. A plurality of shaped flakes, wherein each flake has a same general polygonal shape, each flake having a thickness greater than or equal to 0.01 µm and less than or equal to 10 µm, and wherein each flake has a remnant in the form of a protruding wall segment on one side of each of the flake wherein the remnant is result of breaking or grinding to form the shaped flakes, and wherein a width of the remnant is less than 20% of a major dimension of the flake so that the general polygonal shape of each flake is distinguishable.

2. A plurality of shaped flakes as defined in claim 1, wherein one surface of the flake is substantially planar and wherein another opposite surface of the flake is not entirely planar due to the presence of one or more remnants, and wherein the flake is of a size such that the polygonal shape can only be seen with magnification.

3. A plurality of shaped flakes as defined in claim 2 wherein edges of each of the flakes are jagged as a result of a breaking or grinding process.

4. A plurality of shaped flakes as defined in claim 3 comprising a binder.

5. A plurality of shaped flakes wherein the shaped flakes as defined in claim 1 wherein the flakes have indicia thereon.

6. A plurality of shaped flakes as defined in claim 1 wherein a remnant has a width and length in the plane of the flake, and a height.

7. A plurality of shaped flakes as defined in claim 1 wherein the shaped flakes comprise bright flakes.

8. A plurality of shaped flakes of claim 7 wherein the shaped flakes have a grating pattern, the selected shape being visible at a first magnification and the grating pattern not being visible at the first magnification, wherein the grating pattern is visible at a second magnification, the second magnification being greater than the first magnification.

9. A plurality of shaped flakes of claim 1 wherein the shaped flakes include a grating pattern which can only be seen with magnification.

10. A plurality of shaped flakes of claim 2 wherein the flakes have a reflective layer, a spacer layer, and an absorber layer.

11. A plurality of shaped flakes as defined in claim 1, wherein the shaped flakes include single-layer inorganic dielectric taggent flakes.

* * * * *